(12) United States Patent
Matsushita et al.

(10) Patent No.: US 10,817,209 B2
(45) Date of Patent: Oct. 27, 2020

(54) STORAGE CONTROLLER AND STORAGE CONTROL METHOD

(71) Applicant: HITACHI, LTD., Tokyo (JP)

(72) Inventors: Takaki Matsushita, Tokyo (JP); Tomohiro Kawaguchi, Tokyo (JP); Kazuei Hironaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 48 days.

(21) Appl. No.: 16/295,766

(22) Filed: Mar. 7, 2019

(65) Prior Publication Data

US 2020/0097179 A1 Mar. 26, 2020

(30) Foreign Application Priority Data

Sep. 20, 2018 (JP) .................. 2018-175810

(51) Int. Cl.
*G06F 3/06* (2006.01)

(52) U.S. Cl.
CPC ............ *G06F 3/065* (2013.01); *G06F 3/0604* (2013.01); *G06F 3/0676* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,527,544 B1* | 9/2013 | Colgrove | G06F 3/0608 707/791 |
| 2010/0211616 A1* | 8/2010 | Khandelwal | G06F 12/0868 707/812 |
| 2016/0026529 A1* | 1/2016 | Volvovski | G06F 11/1076 714/770 |
| 2016/0062661 A1* | 3/2016 | Chen | G06F 11/1451 711/162 |

* cited by examiner

*Primary Examiner* — Tracy C. Chan
(74) *Attorney, Agent, or Firm* — Volpe Koenig

(57) ABSTRACT

Provided is a storage controller that reduces a reference number to duplicate data even if there is duplicate data. The storage controller includes a memory and processor and is connected to a server and physical storage device. The memory stores a VOL management table, an address translation table, and a generation management table; registers a first provision volume and a first additional writing volume in the VOL management table; registers a reference destination of a first address of the first provision volume as a second address of the first additional writing volume in the address translation table. The processor receives a request for replication of the first provision volume; registers the second provision volume and the third provision volume in the generation management table as the child generation of the first provision volume; and processes the request to the first provision volume as a request to the third provision volume.

12 Claims, 27 Drawing Sheets

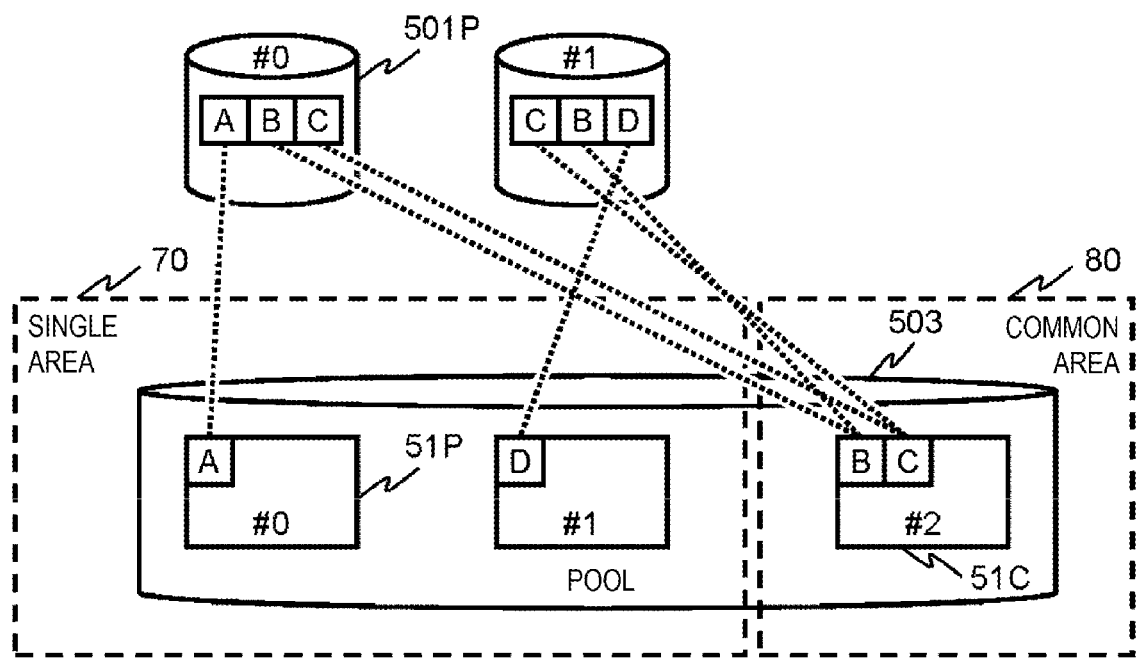
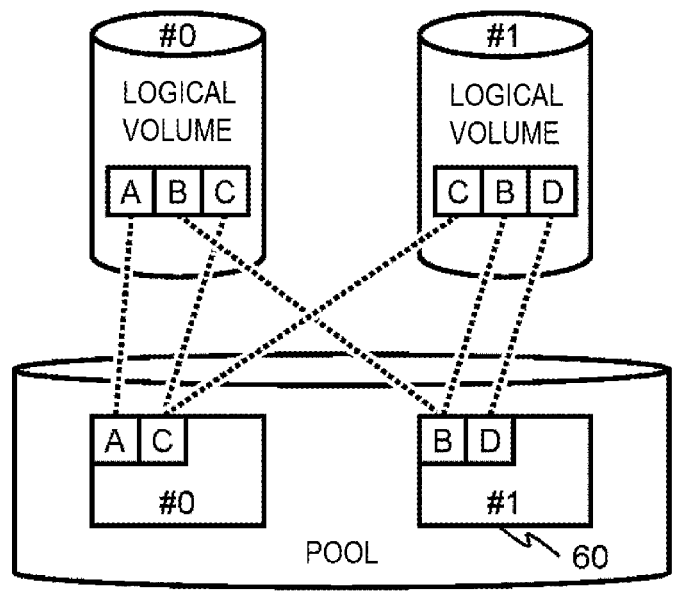

FIG. 8
VOL CONTROL TABLE 421

| VOL# | VOL ATTRIBUTE | VOL CAPACITY | POOL# |
|---|---|---|---|
| 0 | PROVISION | 200GB | 0 |
| 10 | ADDITIONAL WRITING | 200GB | 0 |
| 20 | COMMON | 200GB | 0 |
| 30 | DUPLICATE SINGLE | 200GB | 0 |
| ... | ... | ... | ... |

801 802 803 804

FIG. 9
ADDRESS TRANSLATION TABLE 422

| VOL INTERNAL ADDRESS | REFERENCE DESTINATION VOL# | REFERENCE DESTINATION VOL INTERNAL ADDRESS | DATA SIZE | REFERENCE DESTINATION VOL TYPE |
|---|---|---|---|---|
| 0 | 100 | 10 | 1 | SINGLE |
| 10 | 100 | 20 | 5 | SINGLE |
| 20 | 200 | 50 | 10 | COMMON |
| ... | ... | ... | ... | ... |

VALID AREA MANAGEMENT TABLE 424

| VOL INTERNAL ADDRESS | VALID FLAG |
|---|---|
| 0 | YES |
| 10 | YES |
| 20 | NONE |
| ... | ... |

FIG. 11

PAGE TRANSLATION TABLE 425

| VOL INTERNAL ADDRESS | ALLOCATION FLAG | PAGE# |
|---|---|---|
| 0 | ALLOCATED | 0 |
| 100 | ALLOCATED | 1 |
| 200 | UNALLOCATED | — |
| ... | ... | ... |

FIG. 12

PAGE ALLOCATION MANAGEMENT TABLE 426

| PAGE# | ALLOCATION FLAG | ALLOCATION DESTINATION VOL# | ALLOCATION DESTINATION VOL INTERNAL ADDRESS |
|---|---|---|---|
| 0 | ALLOCATED | 0 | 100 |
| 1 | ALLOCATED | 1 | 200 |
| 2 | UNALLOCATED | — | — |
| ... | ... | ... | ... |

FIG. 13
SUB-BLOCK MANAGEMENT TABLE 427

| PAGE# | PAGE INTERNAL ADDRESS | ALLOCATION FLAG | VOL INTERNAL ADDRESS | SUB-BLOCK SIZE |
|---|---|---|---|---|
| 1301 | 1302 | 1303 | 1304 | 1305 |
| ... | ... | ... | ... | ... |

FIG. 14
ADDITIONAL WRITING DESTINATION SEARCH TABLE 428

| VOL# | ADDITIONAL WRITING DESTINATION ADDRESS | TERMINATION ADDRESS |
|---|---|---|
| 1401 | 1402 | 1403 |
| 10 | 10 | 10000 |
| ... | ... | ... |

FIG. 15
DUPLICATION CHECK TABLE 489

| OBJECT VOL# | OBJECT VOL INTERNAL ADDRESS | HASH VALUE | HIT FLAG | COMPARISON DESTINATION VOL# | COMPARISON DESTINATION VOL INTERNAL ADDRESS | COMPARISON SUCCESS FLAG | STORAGE DESTINATION VOL# | STORAGE DESTINATION VOL INTERNAL ADDRESS |
|---|---|---|---|---|---|---|---|---|
| 1501 | 1502 | 1503 | 1504 | 1505 | 1506 | 1507 | 1508 | 1509 |
| 0 | 0 | 1111 | HIT | 1 | 0 | SUCCESS | — | — |
| ... | ... | ... | ... | ... | ... | ... | ... | ... |

HASH MANAGEMENT TABLE 429

| 1601 | 1602 | 1603 | 1604 |
| --- | --- | --- | --- |
| HASH VALUE | REGISTRATION FLAG | VOL# | VOL INTERNAL ADDRESS |
| 0 | COMPLETED | 0 | 100 |
| 1 | COMPLETED | 1 | 50 |
| 2 | COMPLETED | 1 | 30 |
| 3 | NOT YET | — | — |
| ... | ... | ... | ... |

DUPLICATE MANAGEMENT TABLE

FIG. 18
COMMON AREA ALLOCATION MANAGEMENT TABLE

| VOL INTERNAL ADDRESS | IN-USE FLAG |
|---|---|
| 0 | IN USE |
| 1 | UNUSED |
| 2 | UNUSED |
| 3 | IN USE |
| ... | ... |

FIG. 19
COMMON AREA CHECK TABLE

| VOL INTERNAL ADDRESS | REFERENCE FLAG |
|---|---|
| 0 | YES |
| 1 | NONE |
| 2 | NONE |
| 3 | YES |
| ... | ... |

FIG. 34

GENERATION MANAGEMENT TABLE 432

| VOL# | PARENT GENERATION VOL# | CHILD GENERATION VOL# |
|---|---|---|
| 0 | — | 1 |
| 0 | — | 2 |
| 1 | 0 | 3 |
| 1 | 0 | — |
| 2 | 0 | 4 |

FIG. 35

REAL DATA POSITION MANAGEMENT BITMAP 433

| VOL INTERNAL ADDRESS | FLAG IN-USE FOR EACH GENERATION VOL# | | | | |
|---|---|---|---|---|---|
| | 0 | 1 | 2 | 3 | 4 |
| 0 | YES | NONE | NONE | NONE | NONE |
| 1 | YES | YES | NONE | NONE | NONE |
| 2 | YES | NONE | YES | NONE | YES |
| 3 | YES | NONE | NONE | YES | NONE |
| ... | ... | ... | ... | ... | ... |

STORAGE CONTROLLER AND STORAGE CONTROL METHOD

BACKGROUND OF THE INVENTION

1. Field of the Invention

The present invention relates to a storage controller and a storage control method.

2. Description of the Related Art

An example of a computer system is a storage system. Generally, in the storage system, there is a plurality of layers of a logical storage area. Hereinafter, the logical storage area of a first layer among the plurality of layers will be referred to as "first logical storage area", and the logical storage area of a second layer among the plurality of layers will be referred to as "second logical storage area".

The second layer is a layer higher than the first layer. The first logical storage area is configured by a plurality of partial areas. The second logical storage area, for example, is a virtual volume (virtual logical volume) according to Thin Provisioning, and in this case, the first logical storage area is a pool composed of a plurality of pages (an example of the partial areas) that can be allocated to the virtual volume.

One of data amount reduction functions is a de-deduplication function. The de-duplication function is, in general, a function that, when a duplication of (contents of) a plurality of data sets each corresponding to a plurality of logical addresses (a plurality of different write destinations in two or more second logical storage areas) is detected, a reference destination of the plurality of logical addresses is set as the partial area in which one of the plurality of data sets (duplicate data set) is stored, and a remaining data set is deleted.

Specification of U.S. Pat. No. 8,527,544 (Patent Literature 1) describes a storage system having the de-duplication function and a garbage collection function.

According to the storage system described in Patent Literature 1, it is possible to reduce the amount of data by the de-duplication function. However, since the reference destination of the plurality of logical addresses is set as a duplicate data set, for example, in order to move a duplicate data set for garbage collection, each of the reference destination of a plurality of logical addresses also has to be updated and a throughput is increased. However, there is no description of technology about this in the patent Literature 1.

SUMMARY OF THE INVENTION

It is therefore an object of the present invention to provide the storage that can reduce a reference number to a duplicate data even if there is the duplicate data.

A representative storage according to the invention is a storage controller that includes a first interface which connects the storage controller to a server, a second interface which connects the storage controller to a physical storage device, a memory which stores a plurality of programs and a plurality of tables, and a processor which executes a first program among the plurality of programs stored in the memory and controls the second interface in response to a request received at the first interface. The memory stores a VOL management table, an address translation table, and a generation management table as a part of the plurality of tables, registers a first provision volume and a first additional writing volume in the VOL management table, registers a reference destination of a first address of the first provision volume as a second address of the first additional writing volume in the address translation table, and registers that there is no child generation of the first provision volume in the generation management table. The processor executes a second program among the plurality of programs stored in the memory, so as to receive a request for replication of the first provision volume at the first interface, to register a second provision volume and a second additional writing volume in the VOL management table, to register a third provision volume and a third additional writing volume in the VOL management table, to register the second provision volume and the third provision volume in the generation management table as the child generation of the first provision volume, to register the first provision volume in the generation management table as a parent generation of each of the second provision volume and the third provision volume, and to process the request to the first provision volume received at the first interface as a request to the third provision volume.

According to the present invention, it is possible to provide a storage that can reduce the reference number to the data even if there is the duplicate data.

BRIEF DESCRIPTION OF THE DRAWINGS

FIG. 1 is a diagram showing an example of one embodiment of the invention.

FIG. 2 is a diagram showing a comparative example of duplicate elimination.

FIG. 8 is a diagram showing an example of a VOL management table.

FIG. 9 is a diagram showing an example of an address translation table.

FIG. 10 is a diagram showing an example of a valid area translation table.

FIG. 11 is a diagram showing an example of a page translation table.

FIG. 12 is a diagram showing an example of a page allocation management table.

FIG. 13 is a diagram showing an example of a sub-block management table.

FIG. 14 is a diagram showing an example of an additional writing destination search table.

FIG. 15 is a diagram showing an example of a duplication check table.

FIG. 18 is a diagram showing an example of a common area allocation management table.

FIG. 19 is a diagram showing an example of a common area check table.

FIG. 34 is a diagram showing an example of the generation management table.

FIG. 35 is a diagram showing an example of a real data position management bitmap.

DESCRIPTION OF THE PREFERRED EMBODIMENTS

Figure 3:
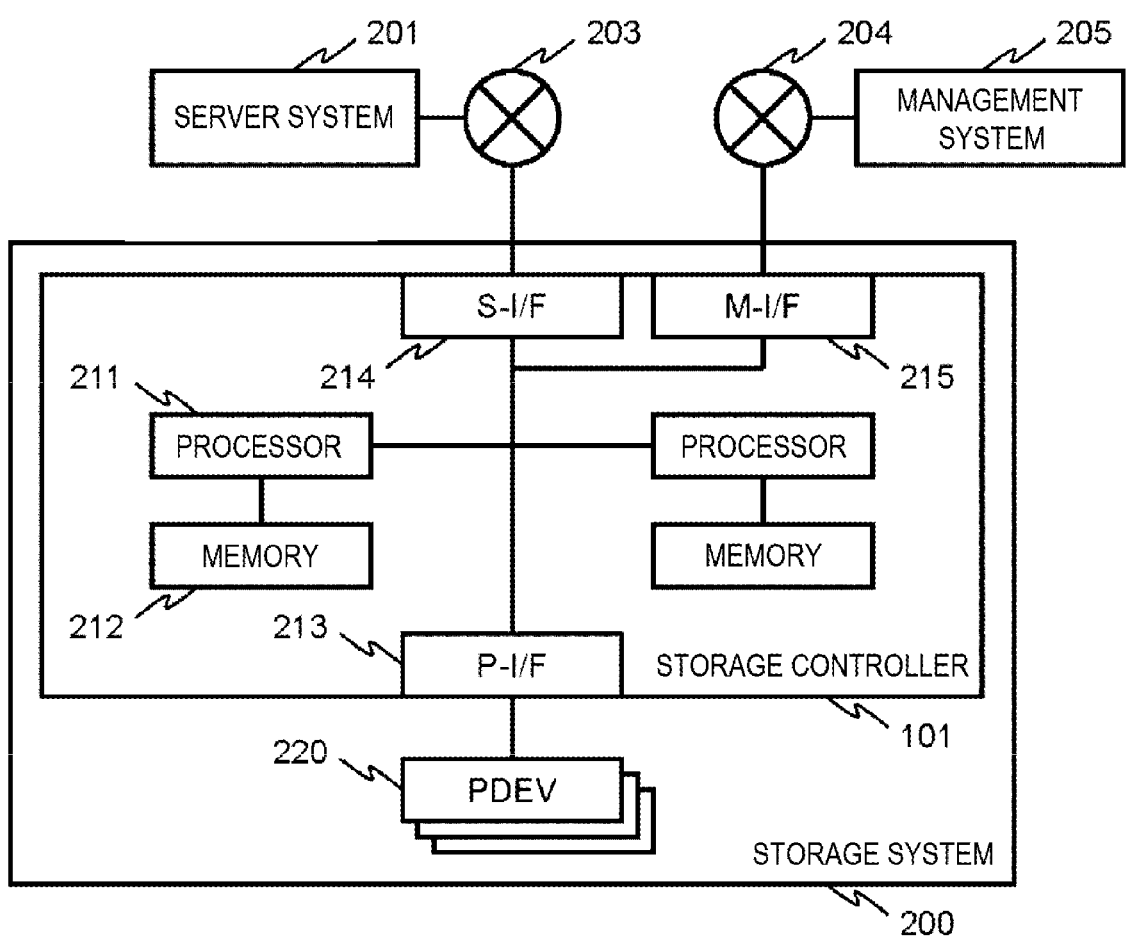
FIG. 3 is a diagram showing a configuration example of a system including a storage system.

In the following description, "interface unit" may be one or more interfaces. The one or more interfaces may be one or more of a same kind of communication interface device (for example, one or more NIC (Network Interface Card)), two or more disparate communication interface devices (e.g., NIC and HBA (Host Bus Adapter)) may be used.

Also, in the following description, a "memory unit" is one or more memories, and may be typically a main storage device. At least one memory in the memory unit may be a volatile memory or a nonvolatile memory.

Also, in the following description, the "PDEV unit" is one or more PDEVs, and may typically be an auxiliary storage device. "PDEV" means a physical storage device, and typically is a nonvolatile storage device, for example, Hard Disk Drive (HDD) or Solid State Drive (SSD).

Also, in the following description, the "storage unit" is at least one (typically, at least a memory unit) of the memory unit and at least a part of the PDEV unit.

Also, in the following description, "processor unit" is one or more processors. The at least one processor is typically a microprocessor such as a Central Process Unit (CPU), but may also be another kind of processor such as a Graphics Process Unit (GPU). The at least one processor may be a single core or a multi core.

Also, at least one processor may be a processor in a broad sense such as a hardware circuit (for example, Field-Programmable Gate Array (FPGA) or Application Specific Integrated Circuit (ASIC)) that performs part or all of the process.

Also, in the following description, the expression "xxx table" sometimes describes information that can obtain an output with respect to an input. The information may be data of any structure or a learning model such as a neural network which generates the output with respect to the input. Therefore, "xxx table" can be called "xxx information".

Also, in the following description, the configuration of each table is an example, and one table may be divided into two or more tables, all or a part of two or more tables may be one table.

Also, in the following description, there are cases where the process is described with "program" as a subject, but the program is executed by the processor unit, so that the determined process can be appropriately executed by a storage unit and/or an interface unit or the like, therefore, the subject of the process may be a processor unit (or a device such as a controller having the processor unit thereof).

The program may be installed in a device such as a computer, for example, in a program distribution server or a computer readable (for example, non-transitory) recording medium. Also, in the following description, two or more programs may be realized as one program, or one program may be realized as two or more programs.

Also, in the following description, "computer system" is a system including one or more physical computers. The physical computer may be a general purpose computer or a dedicated computer. A physical computer may function as a computer (for example, a host computer) that issues an I/O (Input/Output) request, or a computer (for example, a storage device) that performs an I/O of data in response to an I/O request.

That is, the computer system includes at least one of a host system that is one or more host computers that issue I/O requests, and a storage system that is one or more storage devices that performs an I/O of data in response to I/O requests. In at least one physical computer, one or more virtual computers (for example, Virtual Machine (VM)) may be executed. The virtual computer may be a computer that issues the I/O request or a computer that performs an I/O of data in response to an I/O request.

Also, the computer system may be a distributed system constituted by one or more (typically a plurality of) physical node devices. A physical node device is a physical computer.

Also, Software-Defined anything (SDx) may also be built in a physical computer (for example, a node device) or the computer system including the physical computer by the physical computer executing predetermined software. For example, Software Defined Storage (SDS) or Software-defined Datacenter (SDDC) may be adopted as SDx.

For example, a storage system as an SDS may be constructed by executing software having a storage function on a physical general-purpose computer.

Also, at least one physical computer (for example, a storage device) may execute one or more virtual computers as the host system and a virtual computer as a storage controller of a storage system (typically, as a device for inputting/outputting to/from the PDEV unit in response to I/O requests).

In other words, the at least one physical computer may have both a function as at least part of the host system and a function as at least part of the storage system.

Also, the computer system (typically the storage system) may have a redundant configuration group. The redundant configuration may be configured by a plurality of node devices such as Erasure Coding, Redundant Array of independent Nodes (RAIN) and inter-node mirroring, or may be configured as a single computer (for example, a node device) such as one or more Redundant Array of Independent (or Inexpensive) Disks (RAID) group as at least a part of the PDEV unit.

Also, in the following description, "Data set" is a piece of logical electronic data as seen from a program such as an application program, and may be any of record, file, key value pair and tuple, for example.

Also, in the following description, an identification number is used as identification information of various objects, but identification information of a type other than the identification number (for example, an identifier including letters and symbols) may be adopted.

Also, in the following description, in the case of describing the same kind of element without discrimination, reference signs (or common symbols among reference symbols) are used, and in the case of describing the same kinds of elements distinguished from each other, an identification number (or reference number) of element may be used.

For example, when explaining "page" which is a unit of a storage area without particularly distinguishing it, the page is described as "page 51". In the case where each page is described distinctively, the page may be described as "page #0", "page #1" by using page number, or may be described as "single page 51 P", "common page 51 C" by using reference numerals.

An embodiment of the invention will be described below with reference to the drawings.

FIG. 1 is a diagram showing an example of one embodiment of the invention. As an example of the computer system, the storage system 200 described later with reference to FIG. 3 is adopted. In the storage system 200, there are a plurality of layers of a logical storage area (logical address space). One example of one or more first logical storage areas belonging to the first layer is one or more pools 503.

One example of the plurality of second logical storage areas belonging to the second layer (layer higher than the first layer) is a plurality of logical volumes 501. The logical volume 501 is a virtual logical volume conforming to capacity virtualization technology (typically Thin Provisioning). An unallocated (free) page 51 in the pool 503 is allocated to the write destination logical address of the logical volume 501.

The storage system 200 has a storage controller 101 as shown in FIG. 3. The storage controller 101 is an example of a controller including a processor unit. The storage controller 101 has a de-duplication function as a data amount reduction function. Also, the storage controller 101 has a volume replication function as a function to virtually copy a logical volume while reducing the data amount.

In the present embodiment, a common area 80 which is a space in which duplicate data sets are stored, and a single area 70 which is a space in which a single data set is stored, are prepared. In other words, the logical address space in the storage system 200 is logically distinguished between the common area 80 and the single area 70. For example, the plurality of logical volumes 501 each include two or more provision volumes 501 P that are two or more logical volumes that can be recognized from the I/O source.

The storage controller 101 performs duplication judgment process of determining whether or not the object data set according to the write request with the provision volume #0 as the write destination is a data set duplicating with any one or more data sets. The duplication judgment process may be either a process (in-process) performed in synchronization with the process of the write request or may be a process (post process) performed asynchronously with the process of the write request after storing the object data set according to the write request.

As a result of the duplication judgment process, if the object data set is a single data set A which does not duplicate with any data set, the storage controller 101 sets the storage destination relating to the data set A to the page #0 belonging to the single area 70 and corresponding to the provision volume #0. A page belonging to the single area 70 may be hereinafter referred to as a "single page". According to the example in FIG. 1, each of pages #0 and #1 is a single page 51 P.

As a result of the duplication judgment process, if the object data set is the data set B (or C) that duplicates with any one or more data sets, the storage controller 101 sets the storage destination relating to the duplicate data set B (or C) to the page #2 belonging to the common area 80.

Page #2 is referred to directly or indirectly from the plurality of write destinations (provision volumes #0 and #1) of each of duplicate data sets B and C. A page belonging to the common area 80 may hereinafter be referred to as a "common page".

According to the example in FIG. 1, the page #2 is the common page 51 C. In the case where the duplication judgment process is a post process, the storage controller 101 copies the data sets B and C from each of the plurality of single pages #0 and #1 assigned to the provision volume #0 and #1, respectively, and deletes the data sets B and C from each of the plurality of single pages #0 and #1.

Thereby, it is possible to avoid occurrence of a situation such as one comparative example illustrated in FIG. 2, that is, occurrence of a situation where a single data set A and a duplicate data set C are mixed in one page 60, thus, with regard to the single page 51 P shown in FIG. 1, collection of the page 51 and copying of the data set between the pages 51 can be performed promptly.

For example, when the provision volume #0 becomes a deletion object, the plurality of single pages 51 P allocated for the provision volume #0 can be released without checking whether or not the single page 51 P is referred to from any other area for each of the plurality of single pages 51 P, and without checking whether or not any area in the provision volume #0 refers to the common area 80.

As a result, it is possible to quickly collect a plurality of single pages 51 P allocated to the provision volume #0.

Further, for example, in the garbage collection process of the single page 51 P, the storage controller 101 copies valid single data sets existing plural among the single pages 51 P in an additional writing manner to any other page 51, and releases the assignment of the single page 51 P of the copy source.

With respect to a single page 51 P, the data set copied between pages 51 is a single data set and is not a duplicate data set. Therefore, updating of the reference destination may be performed only for one logical address (logical address belonging to the provision volume 501 P) of the single data set, and it is not necessary to perform the updating for each of the plurality of logical addresses.

Therefore, it is possible to quickly copy the data set from the single page 51 P to another page 51, and as a result, the garbage collection process of the single page 51 P is made efficient.

Figure 29:
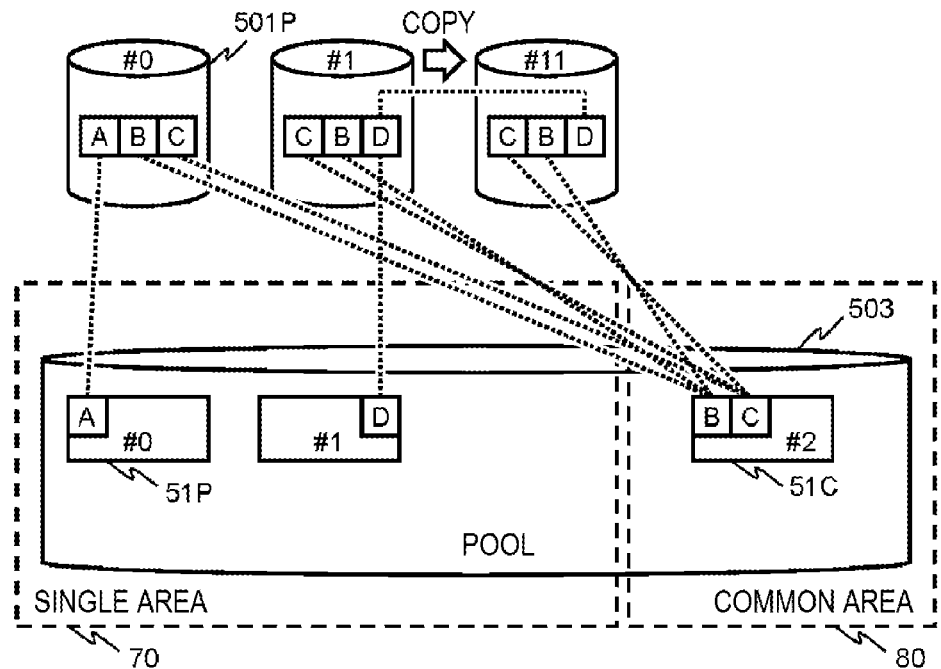
FIG. 29 is a diagram showing an example of replicate of the provision volume.

FIG. 29 is a diagram showing an example of replicating (copying) the provision volume #1 from the state in FIG. 1. Prior to replication, the provision volume #1 has duplicate data sets B and C, and a single data set D. The replication volume #11 of the provision volume #1 refers to the single data set D of the provision volume #1.

That is, after replicating the provision volume #1, the independent data set D existing in the single area 70 is referred to from the provision volume #1, and also from the provision volume #11 indirectly via the logical address of the provision volume #1.

Before the replication, the single data set D referred to only from the provision volume #1 becomes a common data set referred to from the provision volume #1 and the provision volume #11 after replication. However, the data set D is a duplicate data set but does not exist in the common area 80 but exists in the single area 70.

Therefore, the single page #1 existing in the single area 70 before replicating does not become a common page after replicating. A single page that has a duplicate data set while exists in a single area is called a "duplicate single page".

Figure 30:
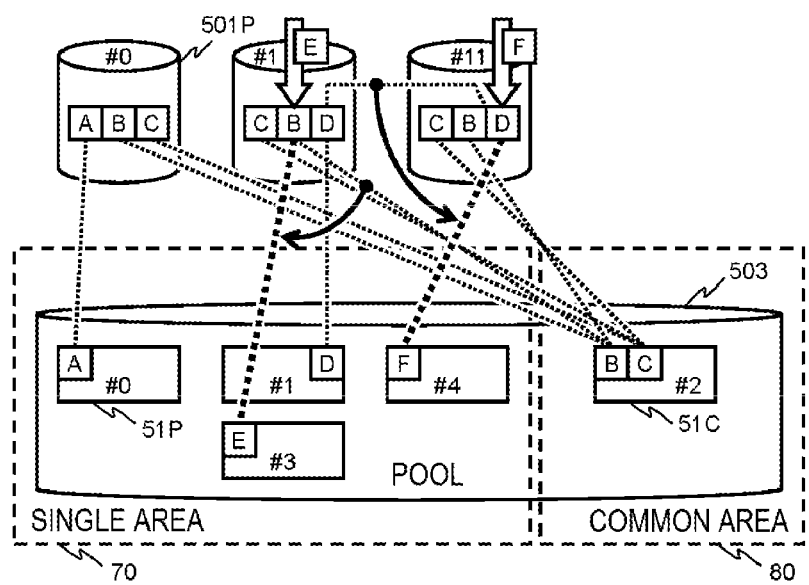
FIG. 30 is a diagram showing an example of writing to the provision volume of a replication source and a replication address after replicating.

FIG. 30 is a diagram showing an example after writing from the state immediately after replicating shown in FIG. 29 to the supply volumes #1 and #11 of the replication source and the replicate destination. When updating the duplicate data set B of the provision volume #1 with the data set E, the storage controller 101 stores the data set E in the newly secured page #3 in the single area 70.

Similarly, when updating the duplicate data set D of the provision volume #11 with the data set F, the storage controller 101 stores the data set F in the newly secured page #4 in the single area 70.

Figure 31:
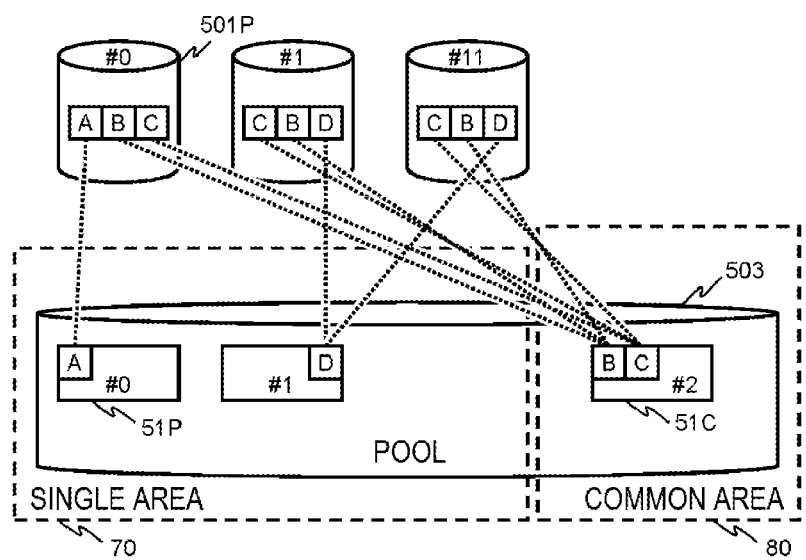
FIG. 31 is a diagram showing one comparative example of duplication single.

As described above, occurrence of a situation like one comparative example shown in FIG. 31, that is, by referring directly to the duplicate data set D of page #1 existing in the single area 70 from the provision volume #11, the problem that the inefficiency of the collection of the page 51 and copying of the data set between the page 51 is solved.

For example, in FIG. 31, in the case where the provision volume #1 becomes the deletion object, the allocated page #1 cannot be simply released since the storage controller 101 also refers to the allocated page #1 with respect to the provision volume #11 from the provision volume #1.

On the other hand, in the example in FIG. 30, when the provision volume #1 becomes the deletion object, the page #3 allocated to the provision volume #1 can be released without checking whether or not the page #3 is referred to from another area since the page #3 is not directly referred to from the provision volume #11.

Therefore, it is possible to quickly collect a plurality of single pages 51 P allocated to the provision volume #1. On the other hand, since the page #1 is a duplicate single page, the page #1 is not released at the time of deletion of the provision volume #1, and the page #1 is released after confirmed that the page #1 is asynchronously not referred to from any of the provision volume 501 P. Details of the process will be described later.

Further, for example, in the garbage collection process of the single page 51 P, the storage controller 101 copies a plurality of valid single data sets among the single pages 51 P in an additional writing manner to any other page 51, and releases the assignment of the single page 51 P of the copy source.

With respect to the single page 51 P (page #3 in FIG. 30), the data set copied between pages 51 is a single data set and is not a duplicate data set. Therefore, updating of the reference destination may be performed only for one logical address (logical address belonging to the provision volume 501 P) of the single data set, and it is not necessary to perform the updating for each of the plurality of logical addresses.

Therefore, it is possible to quickly copy the data set from the single page 51 P to another page 51, and as a result, the garbage collection process of the single page 51 P is made efficient.

Further, for example, the storage controller 101 performs garbage collection process of duplicate single pages in the same manner as the single page 51 P.

That is, regarding the duplicate single page (single page 51 P, page #1 in FIG. 29), the data set copied between pages 51 is a common data set, while the data set existing in page #1 is only a reference from the provision volume #1 as the replication source, and is indirectly referred to from the provision volume #11 as the replication destination via the logical address of the provision volume #1.

Therefore, updating of the reference destination may be performed only for one logical address (logical address belonging to the provision volume 501 P of the replication source) of the common data set, and it is not necessary to perform the updating for each of the plurality of logical addresses. Therefore, it is possible to quickly copy the data set from the duplicate single page to another page 51, and as a result, the garbage collection process of the duplicate single page is made efficient.

Figure 32:
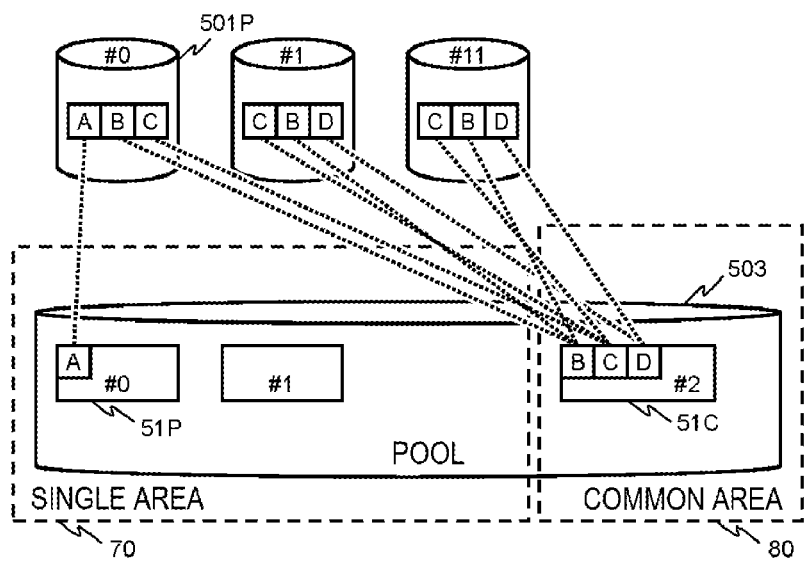
FIG. 32 is a diagram showing one comparative example of duplicate elimination by the common area.

Further, the occurrence of a situation like one comparative example illustrated in FIG. 32 is prevented. That is, since the single data set before replicating becomes a common data set after replicating, it must be stored in the common page, and the data set stored in the single page before replicating is shifted to the common page of the common area 80, thereby preventing the replication time from becoming too long. In the manner, it is possible to quickly perform the replication of the provision volume 501 P without moving the data set.

Hereinafter, the embodiment will be described in detail.

FIG. 3 is a diagram showing the configuration example of a system including the storage system 200. The storage system 200 has a plurality (or one) of PDEVs 220 and a storage controller 101 connected to the plurality of PDEVs 220.

The storage controller 101 has an S-I/F 214, an M-I/F 215, a P-I/F 213, a memory 212, and a processor 211 connected thereto. The S-I/F 214, the M-I/F 215, and the P-I/F 213 are examples of the interface unit. The memory 212 is an example of the storage unit.

The processor 211 is an example of the processor unit. The processor unit may include a hardware circuit that performs compression and decompression. In the embodiment, the processor 211 performs the compression and the decompression. That is, the storage controller 101 has another compression function in addition to the de-duplication function as the data amount reduction function.

The S-I/F 214 is a communication interface device that mediates exchange of data between the server system 201 and the storage controller 101. The server system 201 is connected to the S-I/F 214 via an Fiber Channel (FC) network 203.

The server system 201 sends an I/O request (write request or read request) specifying an I/O destination (for example, a logical volume number such as Logical Unit Number (LUN) or a logical address such as Logical Block Address (LBA)) to the storage controller 101.

The M-I/F 215 is a communication interface device that mediates exchange of data between the management system 205 and the storage controller 101. The management system 205 is connected to the M-I/F 215 via an Internet Protocol (IP) network 204.

The network 203 and the network 204 may be the same communication network. The management system 205 manages the storage system 200.

The P-I/F 213 is a communication interface device that mediates exchange of data between the plurality of PDEVs 220 and the storage controller 101. The plurality of PDEVs 220 is connected to the P-I/F 213.

The memory 212 stores programs executed by the processor 211 and data used by the processor 211. The processor 211 executes a program stored in the memory 212. In the embodiment, for example, the pairs of the memory 212 and the processor 211 are duplexed.

Figure 4:
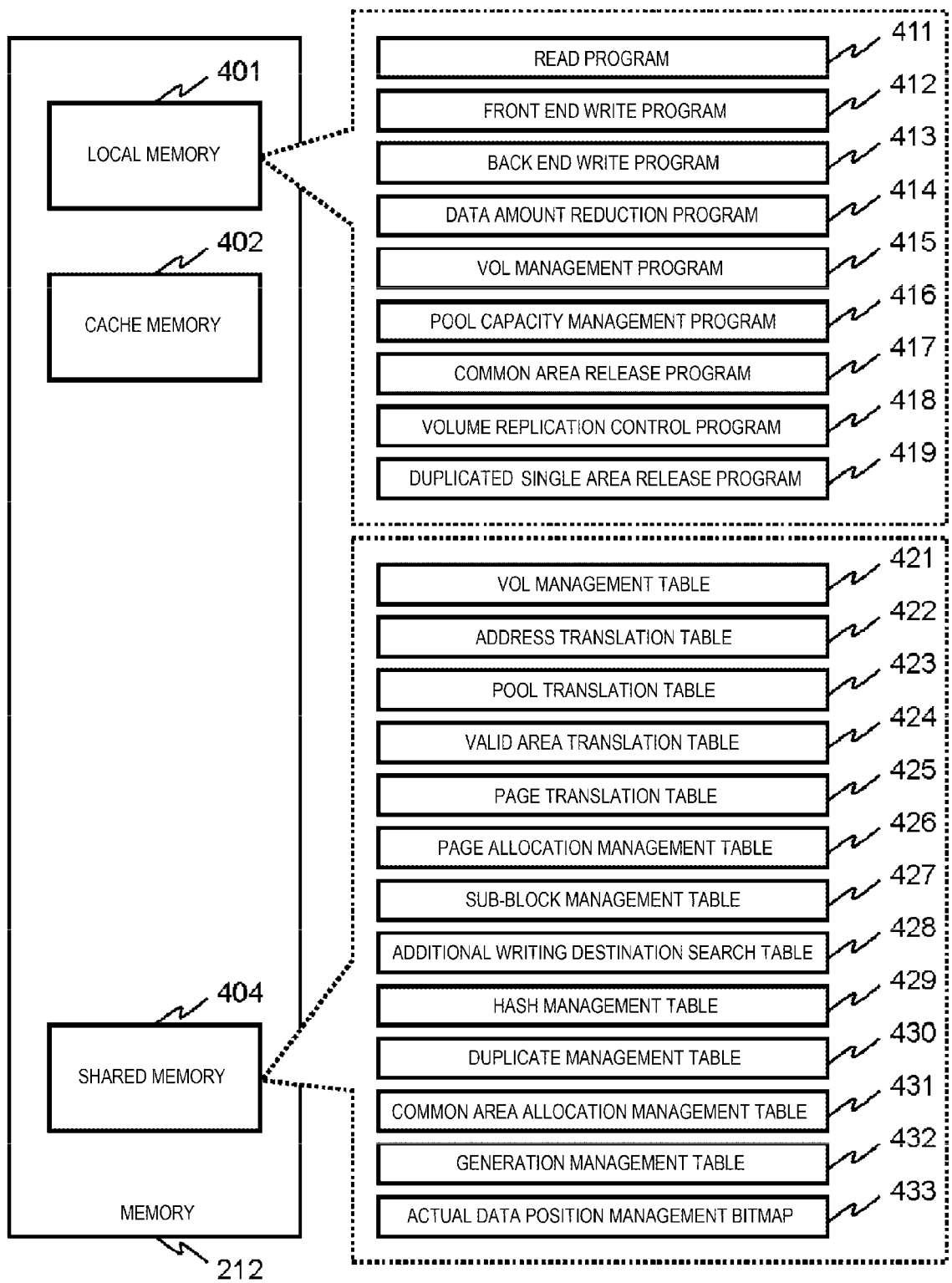
FIG. 4 is a diagram showing an example of a configuration of the memory and programs and control information in the memory.

FIG. 4 a diagram showing an example of the configuration of the memory 212 and programs and management information in the memory 212. The memory 212 includes a memory area that is a local memory 401, a cache memory 402, and a common memory 404. At least one of the memory areas may be an independent memory. The local memory 401 is used by the processor 211 belonging to the same group as the memory 212 including the local memory 401.

A read program 411, a front end write program 412, a back end write program 413, a data amount reduction program 414, a VOL management program 415, a pool capacity management program 416, a common area release program 417, a volume replication control program 418, and a duplicate single area release program 419 are stored in the local memory 401. The programs will be described later.

The data set to be written or read to or from the PDEV 220 is temporarily stored in the cache memory 402.

The common memory 404 is used by both the processor 211 belonging to the same group as the memory 212 including the common memory 404 and the processor 211 belonging to different sets. The management information is stored in the common memory 404.

The management information includes a VOL management table 421, an address translation table 422, a pool management table 423, a valid area management table 424, a page translation table 425, a page allocation management table 426, a sub-block management table 427, an additional writing destination retrieval table 428, a hash management table 429, a duplicate management table 430, a common area allocation management table 431, a generation management table 432, and an actual data position management bitmap 433.

The tables other than the pool management table 423 will be described later with reference to the drawings. The pool management table 423 is a table that holds information in the pool 503.

For example, for each pool 503, the pool management table 423 keeps information of the pool # (the number of the pool 503), RG # (the number of one or more RAID groups on which the pool 503 is based), the pool capacity (the capacity of the pool 503), and the pool use capacity (the used capacity (typically, the total capacity of already allocated pages in the pool 503) of the pool capacity).

Figure 5:
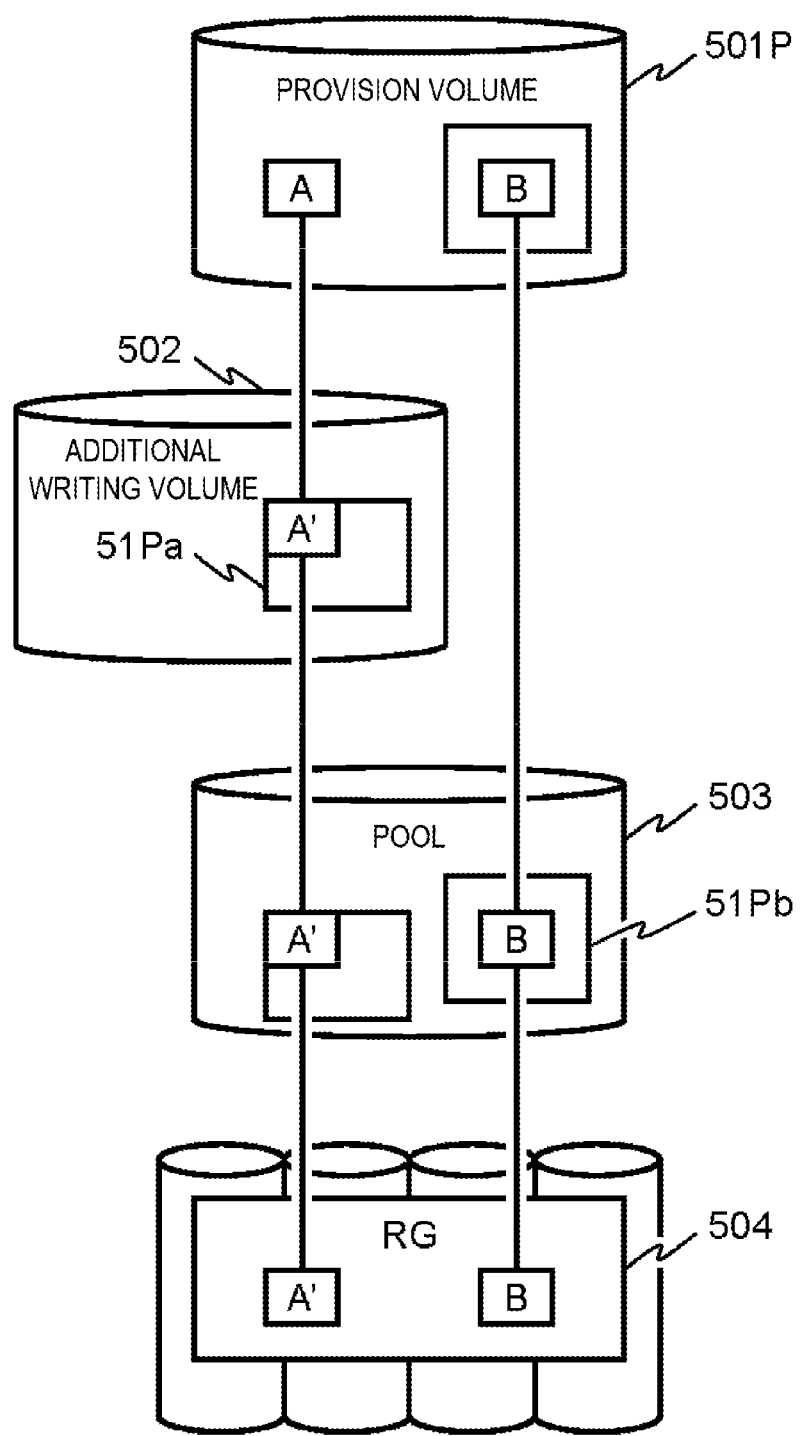
FIG. 5 is a diagram showing an example of a storage hierarchy in the storage system.

FIG. 5 is a diagram showing an example of the storage hierarchy in the storage system 200. In the following description, the nth layer is referred to as "layer n" (n is a natural number). The smaller n is, the higher the layer is. In the storage hierarchy in the storage system 200, there are the provision volume 501 P, an additional writing volume 502, the pool 503, and an RG 504.

The provision volume 501 P is a logical storage area of layer 1 (an example of the second layer described using FIG. 3), and is a logical volume provided to the server system 201 (visible from the server system 201).

Furthermore, as the logical storage area of the layer 1, there is also a common volume that is a logical volume belonging to the common area 80 and not provided to the server system 201 (invisible from the server system 201) in the embodiment as described later.

Furthermore, in the present embodiment, as a logical storage area of layer 1, there is a duplicate single volume which is the logical volume belonging to the single area 70 and not provided to the server system 201 (invisible from the server system 201) as described later.

The additional writing volume 502 is a logical storage area of layer 2, and is a logical volume used for additional writing. Any one of the logical volumes 501 (such as the provision volume 501 P) is associated with one additional writing volume 502. Conversely, one or more additional writing volume 502 is associated with one logical volume 501.

Therefore, the additional writing volume 502 (the logical storage area of the layer 2) and the logical volume 501 (the logical storage area of the layer 1) have a one-to-one or one-to-many relationship. In the embodiment, for simplicity of explanation, it is assumed that the additional writing volume 502 and the logical volume 501 have a one-to-one relationship.

The pool 503 is a logical storage area of layer 3 (an example of the first layer described using FIG. 3), and is the logical storage area based on one or more RGs 504. The pool 503 is composed of a plurality of pages 51. Also, the pool 503 may be based on storage resources external to the storage system 200 instead of or in addition to at least one RG 504.

The RG 504 is a logical storage area of the layer 4, and is a space of a RAID group composed of a plurality of PDEVs 220.

A part of the provision volume 501 P illustrated in FIG. 5 is a "valid area" which is at least a part of two or more of the provision volumes 501 P and is an area in which compression or duplicate elimination is validated. An area other than the valid area of two or more of the provision volumes 501 P is referred to as an "invalid area" in the sense that the compression and the duplicate elimination are invalidated.

When the write destination of the write object data set A is the valid area, the storage controller 101 compresses the write object data set A and writes a compressed data set A' additionally to a page 51 Pa (page 51 Pa which is a single page allocated to the write destination page).

That is, regarding the valid area, the page 51 Pa is the page 51 allocated to the additional writing volume 502 corresponding to the provision volume 501 P, in other words, the page 51 indirectly allocated to the provision volume 501 P.

The additionally written compressed data set A' is stored in the page 51 Pa. The page (page indirectly allocated to the provision volume 501 P) allocated to the additional writing volume 502 can be referred to as "additional writing pace".

On the other hand, when the write destination of the write object data set B is an invalid area, the storage controller 101 stores an uncompressed data set B in the page 51 Pb allocated to the write destination page without compressing the write object data set B.

That is, regarding the invalid area, the page 51 Pb is the page 51 allocated directly to the provision volume 501 P (not via the additional writing volume 502). The uncompressed data set B is stored in page 51 Pb.

The page 51 directly allocated to the provision volume 501 P can be overwritten. A page directly allocated to the provision volume 501 P can be referred to as "overwrite page".

Figure 6:
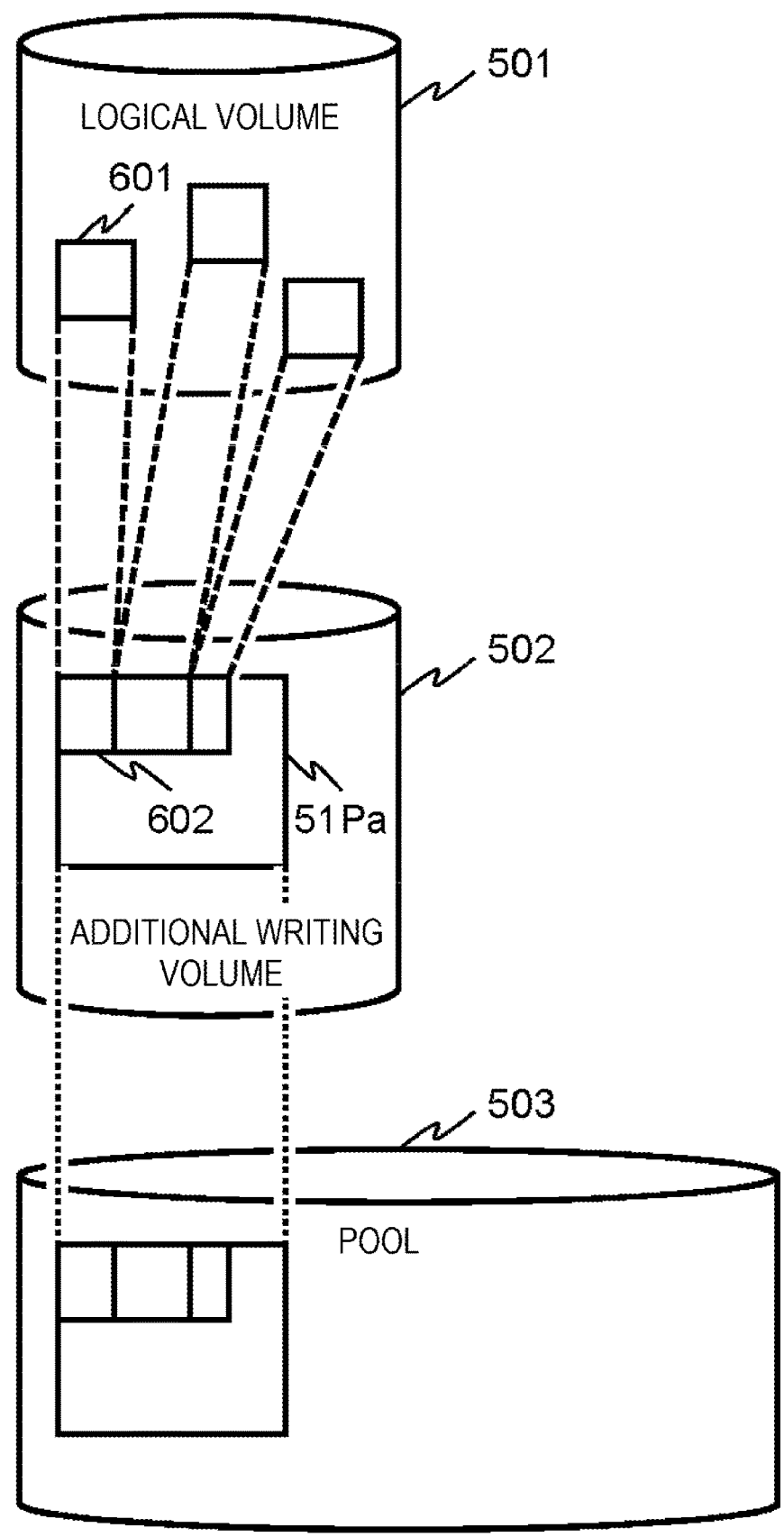
FIG. 6 is a diagram showing an example of additional writing to a page.

FIG. 6 is a diagram showing an example of additional writing to the page 51 Pa. The logical volume 501 is composed of a plurality of blocks 601 which are a plurality of unit areas. In the embodiment, the data set is data in units of blocks.

The data set after compressing is additionally written to the page 51 Pa allocated to the additional writing volume 502 corresponding to the logical volume 501. In the page 51 Pa, the area occupied by the data set after compressing will be referred to as "sub-block 602" in the following description. The sub-block 602 is an example of each of the sub-page area and the sub-part area.

It should be noted that the uncompressed data set may be additionally written in the page 51 Pa, but in the embodiment, the compressed data set is additionally written. In the pool 503, the state of the page 51 Pa is reflected.

Figure 7:
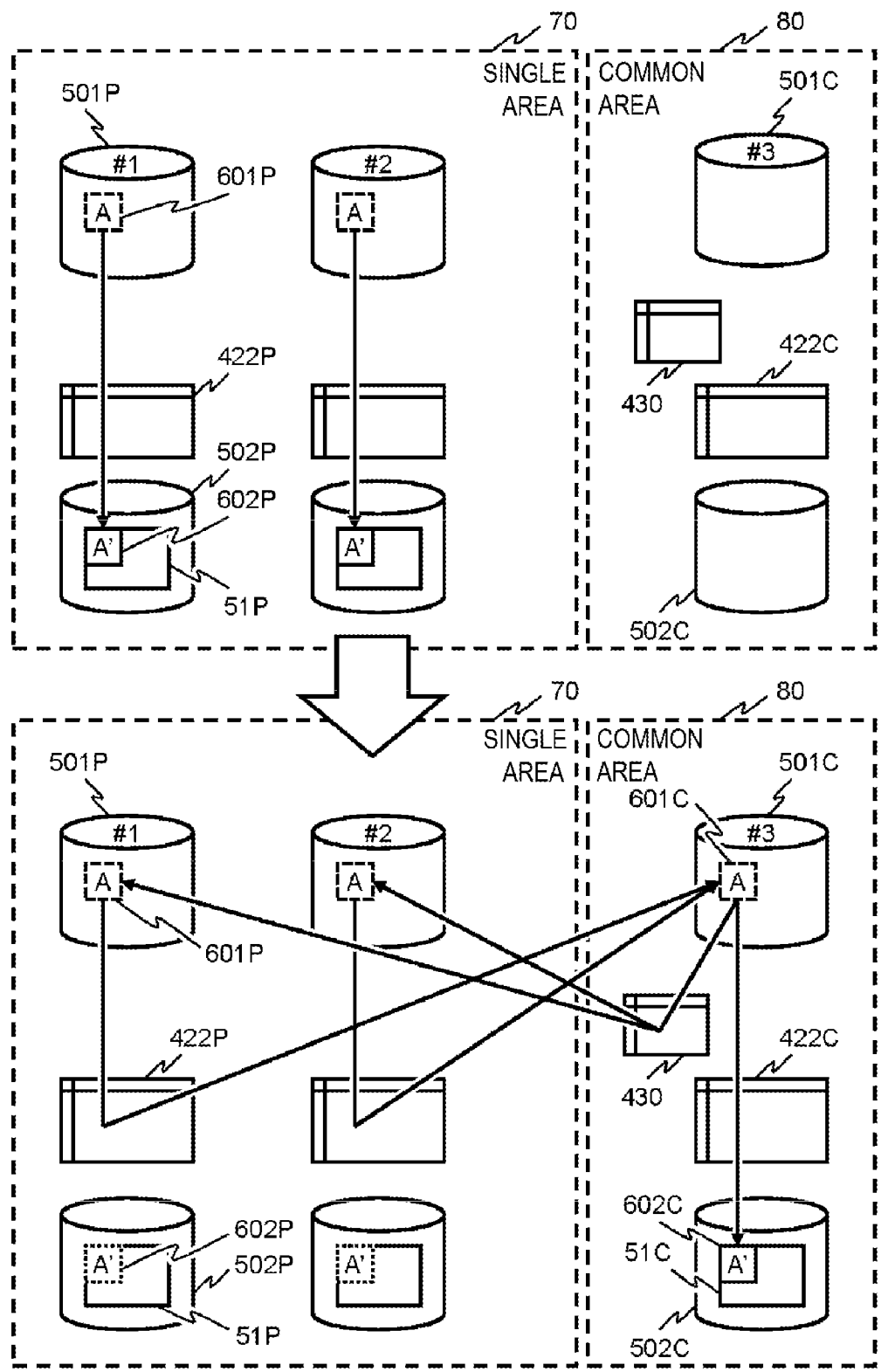
FIG. 7 is a diagram showing an example of de-duplication process.

FIG. 7 is a diagram showing an example of de-duplication process. FIG. 7 shows an example of de-duplication process of a post process in particular, and shows examples before and after de-duplication process at an origin and a tip of a large arrow.

In addition to the provision volume 501 P, there is a common volume 501 C as the logical volume 501. As described above, the common volume 501 C is a logical volume belonging to the common area 80 and not provided to the server system 201. At least a part of the common volume 501 C in FIG. 7 is a valid area. The common volume belonging to the valid area and the common volume belonging to the invalid area may be prepared.

Address translation tables 422 (address translation tables 422 P and 422 C) and additional writing volumes 502 (additional writing volumes 502 P and 502 C) are provided for each logical volume 501.

In the following description, the address translation table 422 corresponding to the logical volume #m (logical volume with VOL #"m" (m is an integer equal to or larger than 0)) may be referred to as "address translation table #m".

Further, in the following description, the additional writing volume 502 corresponding to the logical volume #m may be referred to as "additional writing volume #m".

Further, in the following description, the following terms may be used.

Provision block: Block in the provision volume.
Common block: Block in the common volume.
Duplicate destination block: A common block that is regarded as the write destination (copy destination) of the duplicate data set.
Additional writing single page: A page that is a single page and an additional writing page.
Additional writing common page: A page that is a common page and an additional writing page (page assigned to the additional writing volume corresponding to the common volume).

Since there is provision volumes #1 and #2, there are address translation tables #1 and #2 and additional writing volumes #1 and #2. Also, since there is the common volume #3, there are the address translation table #3 and the additional writing volume #3. The additional writing volumes #1 and #2 belong to the single area 70, and the additional writing volume #3 belongs to the common area 80.

An example of the situation before the de-duplication process is as follows, as shown by the origin of the large arrow in FIG. 7.

The data set A exists in each of the two provision blocks 601 P owned by the provision volume #1 and #2 respectively. As a result, the compressed data set A' (sub-block 602 P) exists in each of the two additional writing single pages (single page 51 P) allocated to the additional writing volumes #1 and #2.

In each of the address translation tables #1 and #2, the reference destination of the logical address of the write destination provision block (provision block 601 P) of the data set A is the logical address of the sub-block 602 P (Sub-block 602 P where compressed data set A' exists) in the additional writing additional writing single page.

The storage controller 101 detects that the duplicate data set A exists in the provision volumes #1 and #2 (judges that the data set A exists) in the duplication judgment process described above for the situation before the above de-duplication process. When detecting, the storage controller 101 performs de-duplication process including, for example, the following process.

The storage controller 101 copies the duplicate data set A (corresponding to the decompressed data set of the compressed data set A') from the valid area provision block 601 P in the provision volumes #1 and #2 to any unused common block 601 C in the valid area of the common volume #3. The common block 601 C at the copy destination is the duplicate destination block (an example of the duplicate destination area).

The storage controller 101 allocates pages to the additional writing volume #3 corresponding to the duplicate destination block (common block 601 C). The allocated page is an additional writing common page (common page 51 C).

The storage controller 101 compresses the duplicate data set A and additionally writes the compressed data set A' in the additional writing common page.

The storage controller 101 updates the address translation table #3. In the updated address translation table #3, the reference destination of the logical address of the duplication destination block (common block 601 C) is the logical address of the sub-block 602 C (the sub-block 602 C in which the compressed data set A' exists) in the additional writing common page (common page 51 C).

The storage controller 101 updates the address translation tables #1 and #2. In each of the updated address translation tables #1 and #2, the reference destination of the logical address of the provision block 601 P becomes the logical address of the duplication destination block instead of the logical address of the sub-block 602 P (sub-block 602 P in which the compressed data set A' exists) in the additional writing single page.

The storage controller 101 manages, as invalid sub-block (unassigned), the sub-block 602 P in which the compressed data set A' is stored, in the two additional writing pages allocated to the additional writing volumes #1 and #2, as indicated by a dotted line.

The storage controller 101 updates the duplicate management table 430. In the updated duplicate management table 430, the reference source of the logical address of the duplication destination block (common block 601 C) is the logical address of the two provision blocks 601 P of copy sources.

The above procedure is an example of de-duplication process. In the above de-duplication process, instead of copying the duplicate data set A to the common block 601

C, the storage controller 101 can also copy additionally any of the compressed data sets A' to the common page 51 C belonging to the common area 80.

Then, the storage controller 101 may set the reference destination of the logical address of the two provision blocks 601 P as the logical address of the sub-block 602 C of the replicate destination page (common page 51 C) and the sub-block 602 P of the copy source as the invalid sub-block when such process is adopted, the common volume 501 C may be omitted.

Further, when the storage controller 101 copies the duplicate data set A to the common block 601 C, the common block 601 C may be allocated to the cache memory 402.

For example, it is assumed that the storage controller 101 receives a write request of writing the data set F in the provision block 601 P of the write destination of the data set A in the provision volume #1.

In this case, the following (c 1) to (c 3) are performed on the additional writing single pace (single page 51 P) of the additional writing volume #1. (C 2) is a process performed when the write request of the data set F is received before the de-duplication process. (C 3) is a process performed when the write request of the data set F is received after the de-duplication process.

(C 1): The storage controller 101 judges whether or not the reference source (old reference source) of the sub-block 602 which is an old sub-block is the logical address of any of the provision blocks 601 P in the provision volume #1.

Here, the "old sub-block" is a sub-block storing the compressed data set A' before updating of the write object compressed data set F'. The "write object compressed data set F'" is the compressed data set of the write object data set F to the write destination provision block 601 P.

(C 2): When the result of the judgment of (c 1) is true, since the old sub-block exists in the additional writing single page, the old sub-block is the sub-block 602 P, the storage controller 101 sets the sub-block 602 P which is the old sub-block as an invalid sub-block (unused sub-block).

Then, the storage controller 101 additionally writes the write object compressed data set F' in the new sub-block and change the reference destination of the logical address of the write destination provision block 601 P from the logical address of the sub-block 602 P which is the old sub-block to the logical address of the new sub-block.

(C 3): When the result of the judgment of (c 1) is false, since the old sub-block exists in the additional writing common page, the old sub-block is the sub-block 602 C, and the storage controller 101 does not set the sub-block 602 C which is the old sub-block as an invalid sub-block.

Then, the storage controller 101 additionally writes the write object compressed data set F' in the new sub-block in the additional writing single page (single page 51 P), and change the reference destination of the logical address of the write destination provision block 601 P from the logical address of the duplicate destination block to the logical address of the new sub-block.

Because of (c 1) and (c 2) as described above, the following situations such as (x 1) and (x 2) may occur.

(X 1): In an additional write single page, the logical address of the valid compressed data set (valid sub-block 602 P) is discontinuous (the valid compressed data set is discrete).

(X 2): While the duplicate destination block (common block 601 C) in the common volume 501 C is also no longer referred to from the provision block 601 P in any of the provision volumes 501 P, the common block 601 C remains in use. As a result, free capacity of the common volume 501 C does not increase and the unnecessary compressed data block continues to remain in the common page 51 C.

Since the situation of (x 1) above may occur, the garbage collection process is necessary for the single area 70. In the embodiment, the garbage collection process can be performed on the single area 70 efficiently.

In other words, in the garbage collection process, since any valid compressed data set is a compressed data set of a single data set, there is only one reference source for each valid compressed data set because it is only necessary to change the reference destination for the only one reference source.

Since the situation of (x 2) above may occur, the storage controller 101 performs releasing process that makes the duplicate destination block unused.

Specifically, in the releasing process, the storage controller 101 excludes, from the one or more reference source blocks (one or more provision blocks 601 P in one or more of the provision volumes 501 P) of the duplicate destination block, the reference source block whose reference destination is not the duplicate destination block.

Then, the storage controller 101 releases the duplicate destination block to be unused, when there is no referring source whose reference destination is the duplicate destination block since one or more reference source blocks are excluded.

Accordingly, the storage controller 101 sets the sub-block 602 C, which is the reference destination of the duplicate destination block to be released, as the invalid sub-block. When there is only one provision block 601 P serving as the reference source of the duplicate destination block in the common volume 501 C, the storage controller 101 may perform any of the following.

The storage controller 101 copies in the additionally writing manner the compressed data set corresponding to the duplicate destination block from the common page 51 C (sub-block 602 C) to the additional writing single page corresponding to the provision volume 501 P including the provision block 601 P serving as the reference source.

Then, the storage controller 101 sets the replication source sub-block 602 C as unused (unassigned) and sets the duplicate destination block as unused. Thereby, the free capacity of the common volume 501 C can be increased.

The storage controller 101 keeps the compressed data set corresponding to the duplicate destination block stored in the common page 51 C. This makes it possible to reduce the occurrence frequency of copy between pages 51.

Figure 33:
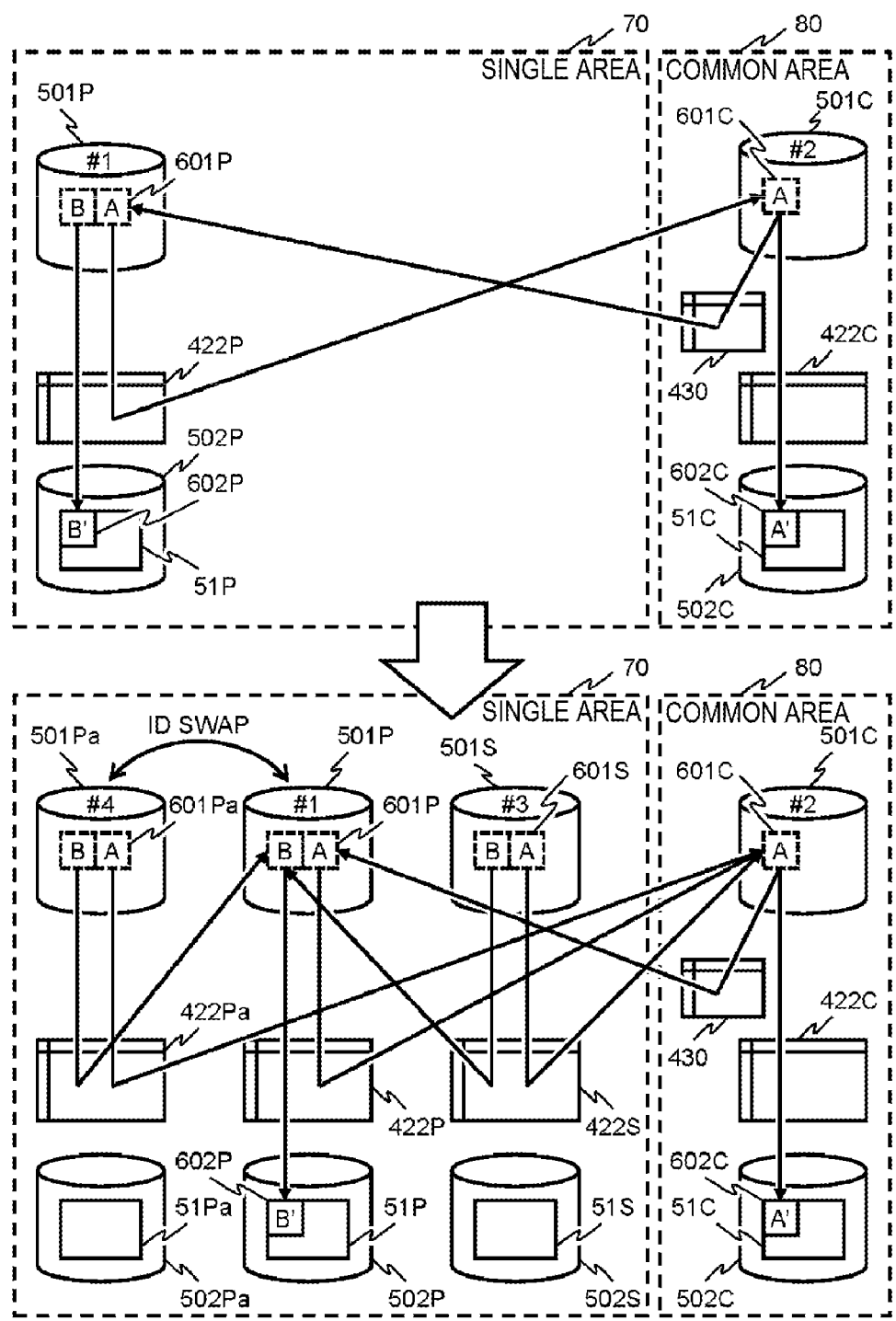
FIG. 33 is a diagram showing an example of volume replicate process.

FIG. 33 is a diagram showing an example of volume replication process. As in FIG. 7, there is a common volume 501 C in addition to the provision volume 501 P as the logical volume 501, each of the address translation table 422 (the address translation tables 422 Pa, 422 P, 422 S, and 422 C) and the additional writing volume 502 is stored in the logical volume 501 respectively.

In addition to the terms defined in the description of FIG. 7, the following terms may be used in the description of FIG. 33.

Additional writing duplicate single page: a page with a single page, an additional writing page and a common data set (a page allocated to an additional writing volume corresponding to a duplicate single volume and having a common data set).

Since there is provision volumes #1, there are address translation tables #1 and additional writing volumes #1. Also, since there is the common volume #2, there are the address translation table #2 and the additional writing volume #2. The additional writing volumes #1 belong to the single area 70, and the additional writing volume #2 belongs to the common area 80.

An example of the situation before the volume replication is as follows, as shown by an origin of a large arrow in FIG. 33.

The data set A and the data set B exists in each of the two provision blocks 601 P owned by the provision volume #1 respectively. The compressed data set A' exists in the additional writing common page (common page 51 C) allocated to the additional writing volume #2. Further, the compressed data set B' is present in the additional writing single pace allocated to the additional writing volume #1.

In the address translation table #1, the reference destination of the logical address of the write destination provision block 601 P of the data set A is the logical address of the duplicate destination block of the common volume #2, and the reference destination of the logical address of the write destination provision block 601 P of the data set B is the logical address of the sub-block 602 P in the additional writing single page.

In response to the above situation, the storage controller 101 creates a provision volume #3 as the replication destination in the volume duplication process. As the provision volume #3 is created, the additional writing volume #3 and the address translation table #3 are also created. The provision volume #3 belongs to the single area 70, and is as shown at a tip of the large arrow in FIG. 33 as described below.

The storage controller 101 creates a logical volume #4 that stores write data to the replication source volume after replicating. As the logical volume #4 is created, the additional writing volume #4 and the address translation table #4 are also created. The logical volume #4 belongs to the single area.

In order to make the read request and the write request issued to the provision volume #1 from the server system 201 before the replication issued to the logical volume #4 after the replication, the volume IDs of the provision volume #1 and the logical volume #4 is swapped. That is, the logical volume #4 becomes the provision volume. In addition, FIG. 33 shows the situation before the swap.

In addition, the provision volume #1 before the swap is a duplicate independent volume which is not provided to the server system 201 the same as the common volume #2. Hereinafter, the duplicate independent volume #1 is referred to as an old generation provision volume, and the provision volume #4 (provision volume #1 after a swap) is sometimes called a latest generation provision volume.

The storage controller 101 creates the address translation table #3 and the address translation table #4 generated by volume replication, for example, by replicating the address translation table #1. In the address translation table #3 and the address translation table #4 after replicating, the reference destination of the logical address of the duplicate source block (provision block 601 S and 601 Pa) corresponding to the duplicate data set A becomes the logical address of the duplicate destination block (common block 601 C).

On the other hand, the reference destination of the duplicate source block (provision block 601 S and 601 Pa) corresponding to the single data set B is not as the same reference destination as the address translation table #1, that is, the logical address of the sub-block 602 P of the additional writing single page (compressed data set B'), but updates so as to be the logical address of the provision block 601 P corresponding to the pre-compression data set A of the old generation provision volume #1 as the replication source.

The above is an example of the volume replication process. It is noted that process similar to the above is performed also in the case of further creating a duplicate volume of the duplicate supply volume 501 S from the state of the tip of the large arrow in FIG. 33.

That is, the storage controller 101 further creates, in the single area 70, the provision volume serving as the replication destination and a new provision volume that stores the write data to the provision volume 501 S serving as the replication source.

The volume ID of the provision volume 501 S and the newly created supply volume are swapped such that the read request and the write request issued from the server system 201 are executed on the newly created logical volume.

In the volume replication process, the storage controller 101 can also not replicate the address translation table #3 and the address translation table #4 corresponding to the replication destination provision volume #3 and the latest generation provision volume #4 from the address translation table #1 corresponding to the replication source old generation provision volume #1.

In this case, in the read process to the replication destination provision volume #3 and the latest generation provision volume #4, referring to the generation management table 432 and the actual data position management bitmap 433, the address translation table 422 in which the actual data exists is identified. Details of the process will be described later.

In addition, since the old generation provision volume #1 is similar to the common volume #3 in that the logical addresses of the duplicate data sets are referred to from the plurality of provision volumes #3 and #4, in the volume replication process, the duplicate management table 430 may be created. In addition, the old generation provision volume #1 may be changed to belong to the common area 80 instead of the single area 70.

For example, the storage controller 101 receives a write request of writing the data set F in the write destination provision block 601 Pa of the data set A among the latest generation-provision volume #4.

In this case, since the storage controller 101 refers to the address translation table #4, and A' corresponding to the old data A before writing exists in the additional writing common page (common page 51 C), the storage controller 101 additionally writes the compressed data set F' of the date object in a new sub-block in the additional writing single page (page 51 Pa of the additional writing volume 502 Pa).

Then, the storage controller 101 changes the reference destination of the logical address of the write destination provision block from the logical address of the duplicate destination block (common block 601 C) to the logical address of the new sub-block.

Further, it is assumed that the storage controller 101 receives a write request of writing the data set G, for example, in the provision block 601 Pa of the write destination of the data set B in the latest generation-provision volume #4.

In this case, the storage controller 101 refers to the address translation table #4, and B' corresponding to the old data B before the writing exists in the single page 51 P which has become the additional writing duplicate single pace.

Therefore, the write t compressed data set G' is additionally written in a new sub-block in the additional writing single page (page 51 Pa), and the reference destination of the logical address of the write destination provision block is changed from the logical address of the provision block 601 P which is the duplicate destination block to the logical address of the new sub-block.

Further, it is assumed that the storage controller 101 receives, for example, a write request of writing the data set H in the provision block 601 S of the write destination of the data set A in the replication destination provision volume #3.

In this case, since the storage controller 101 refers to the address translation table #3 and A' corresponding to the old data A before writing exists in the additional writing common page, the storage controller 101 sets the write object compressed data set H' as the additional writing page 51 S (of additional writing volume 502 S).

Then, the storage controller 101 changes the reference destination of the logical address of the write destination provision block from the logical address of the duplicate destination block (common block 601 C) to the logical address of the new sub-block.

Further, it is assumed that the storage controller 101 receives, for example, a write request of writing the data set I to the write destination provision block 601 S of the data set B in the replication destination provision volume #3.

In this case, the storage controller 101 refers to the address translation table #3, and B' corresponding to the old data B before the writing exists in the single page 51 P which has become the additional write duplicate single page.

Therefore, the write object compressed data set I' is added to the new sub-block in the additional write single page 51 S, and the reference destination of the logical address of the write destination provision block is changed from the logical address of the provision block 601 P as the duplicate destination block to the logical address of the new sub-block.

The same as the common volume #2, the problem of (x 2) described above may occur in the old generation provision volume #1. That is, there is a possibility that the provision block 601P which has become a duplicate destination block in the old generation provision volume #1 will not be referred to from any of the provision block 601 Pa in the provision volume 501 Pa of the latest generation and from the provision block 601 S in the replication destination provision volume 501 S.

Then, the provision block 601P remains in use even though it is no longer referred to. As a result, it occurs that the free capacity of the old generation provision volume #1 is not increased, and also, an unnecessary compressed data block may continue to remain in the single page 51 P which is the additional writing duplicate single page.

Since the situation may occur, similarly to the common volume #2, the storage controller 101 performs release process of making the provision block 601 P, which is a duplicate destination block, unused.

Specifically, the storage controller 101 in the duplicate single area release process excludes reference source blocks whose reference destination is not a duplicate destination block from one or more reference source blocks (one or more provision block 601 Pa in one or more provision volume 501 Pa and one or more provision block 601 S in one or more of the provision volume 501 S).

Then, when one or more reference source blocks are excluded, if there is no reference source whose reference destination is a duplicate destination block, the storage controller 101 releases the provision block 601 P which is the duplicate destination block to be unused.

Accordingly, the storage controller 101 sets the reference sub-block 602 P of the provision block 601 P, which is the redundant destination block to be released, as the invalid sub-block. In the case where there is only one reference source block of the duplicate destination block in the old generation provision volume #1, the storage controller 101 may perform any one of the following.

The storage controller 101 copies in the additionally writing manner the compressed data set corresponding to the provision block 601 P of the duplicate destination block from the single page 51 P of the additional writing duplicate single page to the additional writing single page (page 51 Pa) or the additional writing single page 51 S corresponding to the volume 501 Pa (or the provision volume 501 S) including the reference source provision block 601 Pa (or the reference source provision block 601 S).

Then, the storage controller 101 sets the copy source sub-block 602 P (in the duplicate single page) as unused (unassigned) and sets the duplicate destination provision block 601 P as unused. As a result, it is possible to increase the free capacity of the old generation provision volume #1.

The storage controller 101 keeps the compressed data set corresponding to the provision block 601 P as the duplicate destination block stored in the duplicate single page (single page 51 P). This makes it possible to reduce the occurrence frequency of copying between pages 51.

An example of the table will be described below.

FIG. 8 is a diagram showing an example of the VOL management table 421. In the embodiment, logical volumes provided to the server system 201 such as the provision volume 501 P as well as logical volumes that are not provided to the server system 201, such as the common volume 501 C and the additional writing volume 502, may also be collectively referred to as "VOL".

Also, due to the volume duplication, the provision volumes 501 Pa and 501 S newly provided to the server system 201 and the provision volume 501 P which is the old generation provision volume #1 which is no longer provided to the server system are also "VOL".

The VOL management table 421 holds information relating to the VOL. For example, the VOL management table 421 has an entry for each VOL. Each entry stores information such as a VOL #801, a VOL attribute 802, a VOL capacity 803, and a pool #804. Hereinafter, one VOL (referred to as "object VOL") will be described as an example.

VOL #801 is information on the number (identification number) of the object VOL. The VOL attribute 802 is the information of the attribute of the object VOL (for example, the provision volume is "provision", the additional writing volume is "append", the common volume is "common", the old generation provision volume by volume duplication is "duplicate single"). The VOL capacity 803 is information on the capacity of the object VOL. Pool #804 is information on the number of the pool 503 associated with the object VOL.

FIG. 9 is a diagram showing an example of an address translation table 422. The address translation table 422 is set for each logical volume 501 (logical volume of layer 1). The address translation table 422 holds information relating to the relationship between the reference source logical address and the reference destination logical address.

For example, the address translation table 422 has an entry for each block 601. Each entry stores information such as a VOL internal address 901, a reference destination VOL #902, a reference destination VOL internal address 903, a data size 904, and a reference destination VOL type 905. Hereinafter, one block 601 (referred to as "object block") will be described as an example.

The VOL internal address 901 is information on the logical address (for example, a leading logical address) of the object block in the logical volume 501. The reference destination VOL #902 is information on the number of the VOL (additional writing volume or common volume) to which the object block is referred.

The reference destination VOL internal address 903 is information of a logical address (logical address within the reference destination VOL) corresponding to the logical address of the object block in the VOL of the reference destination of the object block. The data size 904 is information on the size of the compressed data set of the data set in which the object block is the write destination.

The reference destination VOL type 905 is the type of the reference destination VOL of the object block (the types of information of "single" (additional writing volume), "common" (common volume), or "duplicate single" (duplicate single volume)).

FIG. 10 is a diagram showing an example of a valid area management table 424. The valid area management table 424 is set for each logical volume 501. The valid area management table 424 holds information relating to the valid area. For example, the valid area management table 424 has the entry for each block 601.

Each entry stores information such as a VOL internal address 1001 and a valid flag 1002. Hereinafter, one block 601 (referred to as "object block") will be described as an example. The VOL internal address 1001 is information on the logical address of the object block. The valid flag 1002 is information of whether the object block belongs to the effective area ("yes") or not ("none").

FIG. 11 is a diagram showing an example of a page translation table 425. The page translation table 425 is set for each logical volume 501 and for each additional writing volume 502. The page translation table 425 holds information relating to the relationship between the page 51 and the area in the logical volume 501 or the additional writing volume 502 (for example, the block 601 with the same number as the size of the page 51).

For example, the page translation table 425 has an entry for each area in the logical volume 501 or additional writing volume 502. Each entry stores information such as a VOL internal address 1101, an allocation flag 1102, and a page #1103. Hereinafter, one area (referred to as "object area") will be described as an example.

The VOL internal address 1101 is information on the logical address (for example, a leading logical address) of the object area. The allocation flag 1102 is information of whether the page 51 is allocated to the object area ("allocated") or not ("unallocated"). The page number 1103 is information of the number of the page 51 assigned to the object area.

FIG. 12 is a diagram showing an example of a page allocation management table 426. The page allocation management table 426 is set for each pool 503. The page allocation management table 426 holds information relating to the relationship between page 51 and the assign destination thereof. For example, the page allocation management table 426 has an entry for each page 51.

Each entry stores information such as a page #1201, an allocation flag 1202, an allocation destination VOL #1203, and an allocation destination VOL internal address 1204. Hereinafter, one page 51 (referred to as "object page") will be described as an example. Page #1201 is information of the object page number. The allocation flag 1202 is information of whether the page is allocated to the object page ("allocated") or not ("unallocated").

The allocation destination VOL #1203 is information on the number of the allocation destination VOL (logical volume 501 or additional writing volume 502) of the object page. The allocation destination VOL internal address 1204 is information on the logical address (for example, a leading logical address) of the area in the assignment destination VOL of the object page.

FIG. 13 is a diagram showing an example of a sub-block management table 427. The sub-block management table 427 is set for each additional writing volume 502. The sub-block management table 427 holds information relating to the sub-block 602. For example, the sub-block management table 427 has an entry for each sub-block 602.

Each entry stores information such as a page #1301, a page internal address 1302, an allocation flag 1303, a VOL internal address 1304, and a sub-block size 1305.

Hereinafter, one sub-block 602 (referred to as "object sub-block") will be described as an example.

The page #1301 is information on the number of the page 51 including the object sub-block. The page internal address 1302 is information on the logical address of the object block on page 51. The allocation flag 1303 is information of whether the sub-block is allocated to the object page ("allocated") or not ("unallocated"), in other words, information of whether the object sub-block is in use or not used.

The VOL internal address 1304 is information on the logical address of the allocation destination of the object sub-block (the logical address of the area in the additional writing volume 502). The sub-block size 1305 is information on the size of the object sub-block (the size of the compressed data set stored in the object sub-block). The page internal address 1302 and the VOL internal address 1304 may be the same.

FIG. 14 is a diagram showing an example of an additional writing destination search table 428. The additional writing destination search table 428 holds the information on the additional writing destination of the compressed data set. The additional writing destination search table 428 has, for example, an entry for each additional writing volume 502. Each entry stores information such as a VOL #1401, an additional write destination 1402, and an end address 1403.

Hereinafter, one additional writing volume 502 (referred to as "object additional writing volume") will be described as an example. VOL #1401 is information of the number of the object additional writing volume. The additional writing destination address 1402 is the information of the logical address of the additional writing destination in the object additional writing volume (the logical address of the additional writing destination in the additional writing page allocated to the object additional writing volume).

Here, the additional writing destination address 1402 is the information of the top logical address of the additional writing destination. The termination address 1403 is the information of the logical address at the end of the logical address that can become the additional writing destination. When the size according to the difference between the logical address of the additional writing destination and the logical address of the end is less than the data size after compression, since additional writing is impossible, after the garbage collection process, the logical address at the head of the object additional writing volume is set as the additional writing destination once more.

Specifically, for example, the storage controller 101 may preferentially perform the garbage collection process from the additional writing page closer to the logical address at the head of the object additional writing volume. As a result, the additional writing page allocation is preferentially canceled from the additional writing page closer to the logical address at the head of the object additional writing volume, and as a result, can be made unused preferentially from the area closer to the logical address at the head of the object additional writing volume.

FIG. 15 is a diagram showing an example of a duplication check table 489. The duplication check table 489 is created and used in the duplication judgment process. The duplication check table 489 is created for the data to be the object of the duplication judgment process, and is stored in the memory 212, for example. "Data" as used herein is typically prescribed data of the processed object, which is larger than the size of the block.

Therefore, the duplication judgment process (and the storage of data to the single area 70 or the common area 80) may be performed in block units (data set units), but are collectively performed in units of data to be processed instead of block units in the embodiment.

Specifically, for example, the data to be processed is data according to a write request to any of the provision volumes 501 P, the size of the data according to the write request may be an integral multiple of the size of the block, and the duplication judgment process (and, storage of data in the single area 70 or the common area 80) may be performed in a unit of data according to the write request (that is, a unit of I/O request).

As described above, the duplication judgment process (and the storage of data in the single area 70 or the common area 80) is performed collectively in units of data to be processed, so as to be efficient. The duplication check table 489 has entries, for example, for each of one or more blocks 601 corresponding to one or more data sets which constitutes data.

Each entry stores information of an object VOL #1501, an object VOL internal address 1502, a hash value 1503, a hit flag 1504, a comparison destination VOL #1505, a comparison destination VOL internal address 1506, a comparison success flag 1507, a storage destination VOL #1508, and a storage destination VOL internal address 1509.

Hereinafter, one block 601 (referred to as "object block") will be described as an example. The object VOL #1501 is information on the number of the logical volume 501 including the object block. The object VOL internal address 1502 is information on the logical address of the object block.

The hash value 1503 is information on a hash value corresponding to the object block (a hash value of a data set whose object block is a write destination). Th it flag 1504 is information of whether a hash value hit ("Hit") or no bash value hit ("Miss"). "Hash value hit" means that a hash value that coincides with a hash value corresponding to the object block already exists.

The comparison destination VOL #1505 is valid when a hash value hit occurs for the object block, and is information of the number of the comparison destination VOL. "Comparison destination VOL" is a logical volume 501 that stores a data set of a hash value that matches a hash value corresponding to the object block, and is a logical volume 501 that becomes the comparison destination of the data sets. The comparison destination VOL is one of the provision volume 501 P and the common volume 501 C.

The comparison destination VOL internal address 1506 is the information of the logical address (the logical address of the block 601 in the comparison destination VOL) of the block 601 that stores the data set of the hash value coinciding with the hash value corresponding to the object block. For an object block, there may exist a plurality of pairs of the comparison destination VOL #1505 and the comparison destination VOL internal address 1506.

The comparison success flag 1507 is information on whether the comparison between the data sets performed when a hash value hit for the object block occurs has succeeded ("success") or failed ("fail"). If the data sets match each other, the comparison success flag 1507 is "success".

The storage destination VOL #1508 is information of the number of storage destination VOL. The "storage destination VOL" is the logical volume 501 as the storage destination of the data set whose object block is the write destination. If the data set whose object block is the write destination is a single data set, the storage destination VOL is the additional writing volume 502.

If the data set whose object block is the write destination is a duplicate data set, the storage destination VOL is the common writing volume 501. The storage destination VOL internal address 1509 is information of the logical address (the logical address of the block in the storage destination VOL) of the storage destination block of the data set whose object block is the write destination.

Figures 16, 17:
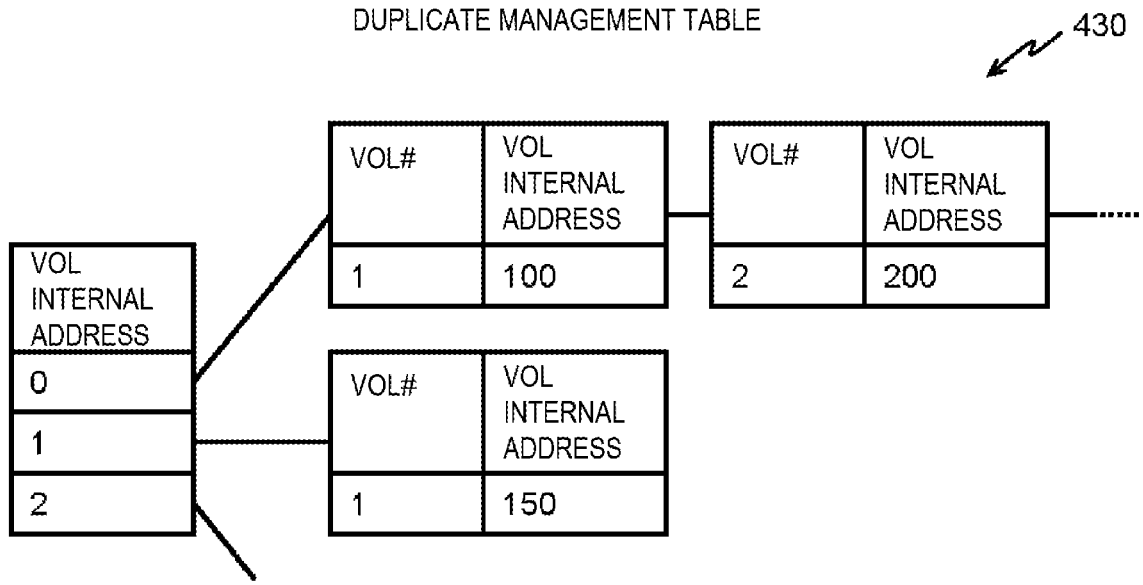
FIG. 16 is a diagram showing an example of a hash management table.
FIG. 17 is a diagram showing an example of a duplicate management table.

FIG. 16 is a diagram showing an example of a hash management table 429. The hash management table 429 holds information relating to the hash value of the data set. For example, the hash management table 429 has an entry for each hash value.

Each entry stores information such as the hash value 1601, the registration flag 1602, the VOL #1603, and the VOL internal address 1604. Hereinafter, one hash value (referred to as "object hash value") will be described as an example.

The hash value 1601 is information on the object hash value itself. The registration flag 1602 is information of whether the data set having the object hash value as a hash value exists in the storage system 200 ("completed") or not ("not yet").

VOL #1603 is information on the number of the logical volume 501 that stores a data set whose hash value is the object hash value. The VOL internal address 1604 is information on the logical address of the block 601 that stores the data set whose hash value is the object hash value.

In the duplication judgment process, when a hash value hit occurs for the object hash value, the information of the VOL #1603 and the VOL internal address 1604 corresponding to the object hash value is set as the information of the comparison destination VOL #1505 and the comparison destination VOL internal address 1506 in the duplication check table 489 shown in FIG. 15.

FIG. 17 is a diagram showing an example of the duplicate management table 430. The duplicate management table 430 holds information relating to the position (logical address) of the duplicate data set. For example, the duplicate management table 430 has a VOL internal address (logical address) for each of the plurality of common blocks 601C constituting the common volume 501C.

In the common block 601 C in which the reference source exists, entries of the reference source are related in a queue format, for example. The reference source entry stores VOL # (number of the logical volume 501 including the reference source block 601) and VOL internal address (logical address of the reference source block 601).

FIG. 18 is a diagram showing an example of the common area allocation management table 431. The common area allocation management table 431 is set for each common volume 501 C. The common area allocation management table 431 holds information relating to a state of availability of the common volume 501 C.

The common area allocation management table 431 has, for example, an entry for each of the plurality of common blocks 601 C configuring the common volume 501 C. Each entry stores information such as a VOL internal address 1801 and an in-use flag 1802. Hereinafter, one common block 601 C (referred to as "object block") will be described as an example.

The VOL internal address 1801 is information on the logical address of the object block. The in-use flag 1802 is information of whether the object block is in use ("in use") or not in use ("unused").

The fact that the information of the in-use flag 1802 is "in use" means that the page 51 is assigned directly (not via additional writing volume) or indirectly (via additional writing volume) to the object block. The fact that the information of the in-use flag 1802 is "not used" means that the page 51 is not allocated to the object block, that is, it is free.

FIG. 19 is a diagram showing an example of the common area check table 434. The common area check table 434 is set for each common volume 501 C. The common area check table 434 holds information relating to the reference status for the common volume 501 C.

The common area check table 434 has entries, for example, for each of the plurality of common blocks 601 C constituting the common volume 501 C. Each entry stores information such as a VOL internal address 1901 and a reference flag 1902. Hereinafter, one common block 601 C (referred to as "object block") will be described as an example.

The VOL internal address 1901 is information on the logical address of the object block. The reference flag 1902 is information indicating whether one or more reference source block 601 exists ("presence") or not ("none") for the object block.

FIG. 34 is a diagram showing an example of the generation management table 432. The generation management table 432 is set for each replication volume group. The replication volume group is a group of the replication volume (provision volume 501 S) and the latest generation provision volume (supply volume 501 Pa) created by the volume replication process of a certain supply volume 501 P (shown in FIG. 33).

The generation management table 432 holds information on generation relationships between volumes. The generation management table 432 has an entry for each volume. Each entry stores information such as a VOL #3401, a parent generation VOL #3402, and a child generation VOL #3403. Hereinafter, description will be given taking one latest generation-provision volume (referred to as "object volume") as an example.

VOL #3401 is information on the number of the object volume. The parent generation VOL #3402 is information on the number of the old generation volume that is the replication source of the object volume. The child generation VOL #3403 is information on the number of the replicate destination volume whose replication source is the object volume.

FIG. 35 is a diagram showing an example of the actual data position management bitmap 433. The actual data position management bitmap 433 is set for each replication volume group. The actual data position management bitmap 433 holds information that specifies the VOL in which the real data indicated by the reference destination of the logical address of the volume is stored.

For example, the actual data location management bitmap 433 has an entry for each block 601. Each entry holds information such as a VOL internal address 3501 and an in-use flag 3502 for each generation VOL #. Hereinafter, one block 601 (referred to as "object block") will be described as an example.

The VOL internal address 3501 is information on the logical address of the object block. The in-use flag 3502 is information for each generation VOL # that indicates whether actual data (data stored in the reference block of any volume) corresponding to the object block exists ("yes") or not ("none").

If the information of the in-use flag 3502 for each generation VOL # is ("none"), the actual data corresponding to the ("none") has no new real data as that generation, and the actual data exists before the generation may be used as the data corresponding to a read request or the like.

Hereinafter, the process performed in the embodiment will be described. In the following description, the compression and decompression of the data set may be executed by the data amount reduction program 414 (or by calling out the data amount reduction program 414).

Figure 20:
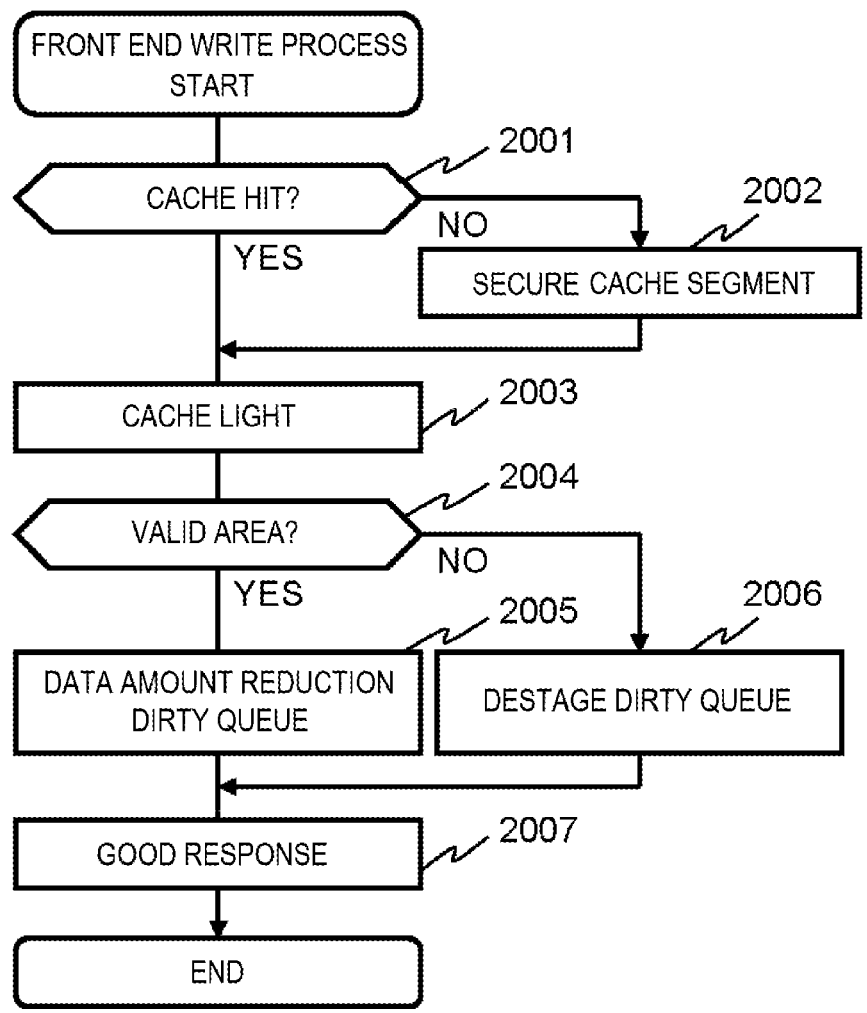
FIG. 20 is a diagram showing an example of a flow of front end write process.

FIG. 20 is a diagram showing an example of the flow of front end write process. The front end write process is performed when a write request to the logical volume 501 is accepted.

The front end write program 412 determines whether or not a cache hit has occurred (step 2001). Regarding the write request, "cache hit" means that a cache segment (area in the cache memory 402) corresponding to the write destination according to the write request is secured.

When the judgment result of step 2001 is false (step 2001: NO), the front end write program 412 secures a cache segment from the cache memory 402 (step 2002).

When the judgment result of step 2001 is true (step 2001: YES), or after step 2002, the front end write program 412 writes write object data according to the write request to the secured cache segment (step 2003).

Based on the effective area management table 424 corresponding to the logical volume 501 of the write destination, the front end write program 412 judges whether or not the write destination belongs to the valid area (step 2004).

When the judgment result of step 2004 is true (step 2004: YES), the front end write program 412 accumulates the write command for each of one or more data sets constituting the write object data in a data amount reduction dirty queue (step 2005).

A "Data amount reduction dirty queue" is a queue in which a write command of a data set is accumulated, which is a dirty data set (a data set not stored in page 51) that needs to be compressed.

When the judgment result of step 2004 is false (step 2004: NO), the front end write program 412 accumulates the write command for each of one or more data set constituting the write object data in a destage dirty queue (step 2006).

A "destage dirty queue" is a queue in which a write command of a data set is accumulated, which is the dirty data set (a data set not yet stored in page 51) that does not needs to be compressed.

After step 2005 or step 2006, the front end write program 412 returns the GOOD response (write completion report) to the sending source of the write request (step 2007). The GOOD response to the write request may be returned when the back end write process is completed.

The back end write process may be performed synchronously or asynchronously with the front end process. The back end write process is performed by the back end write program 413. For example, the back end write program 413 writes the uncompressed or compressed data set in the page 51 allocated for the write destination with respect to the write command in the destage dirty queue.

Figure 21:
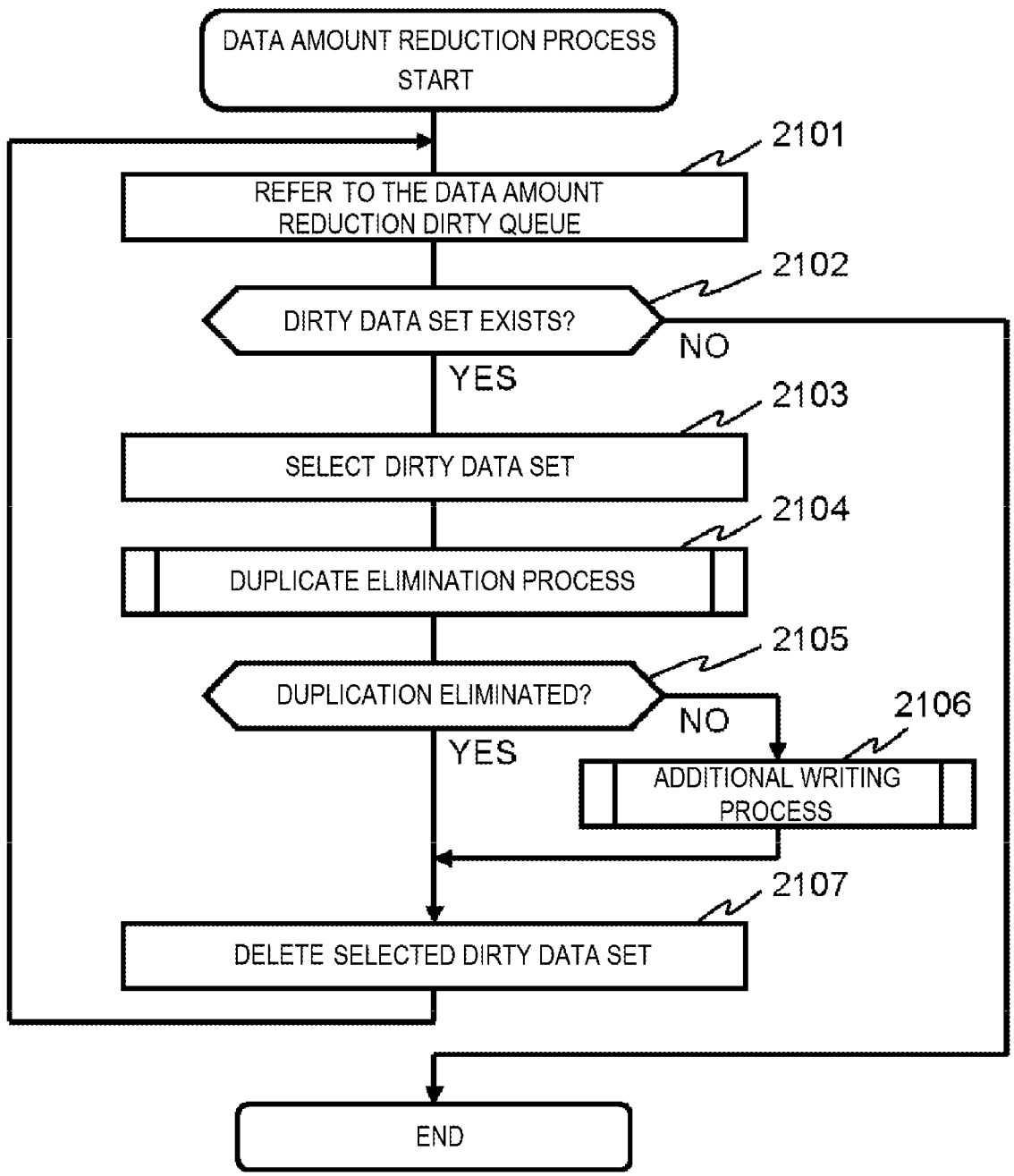
FIG. 21 is a diagram showing an example of a flow of data amount reduction process.

FIG. 21 is a diagram showing an example of the flow of data amount reduction process. The data volume reduction process is performed periodically, for example.

The data amount reduction program 414 refers to the data amount reduction dirty queue (step 2101), judges whether or not there is a command in the data amount reduction dirty queue (step 2102), and if there is no command in the data amount reduction dirty queue as the judgment result (step 2102: NO), the data amount reduction process is terminated.

If there is a command in the data amount reduction dirty queue as a judgment result (step 2102: YES), the data amount reduction program 414 acquires a write command from the data amount reduction dirty queue, that is, selects the dirty data set (step 2103).

The data amount reduction program 414 performs the de-duplication process on the data set selected in step 2103 (step 2104), and determines whether or not there is de-duplication (step 2105). The process of another definition such as step 2104 will be described later.

If the de-duplication has not been performed since the data set selected in step 2103 is a single data set (step 2105: NO), the data amount reduction program 414 carries out additional writing process on the single data set that was not duplicate eliminated (step 2106).

If the de-duplication has been performed since the data set selected in step 2103 is a duplicate data set (step 2105: YES), or after step 2106, the data amount reduction program 414 discards (for example, deletes from the cache memory 402) the data set selected in step 2103 (step 2107).

Figure 22:
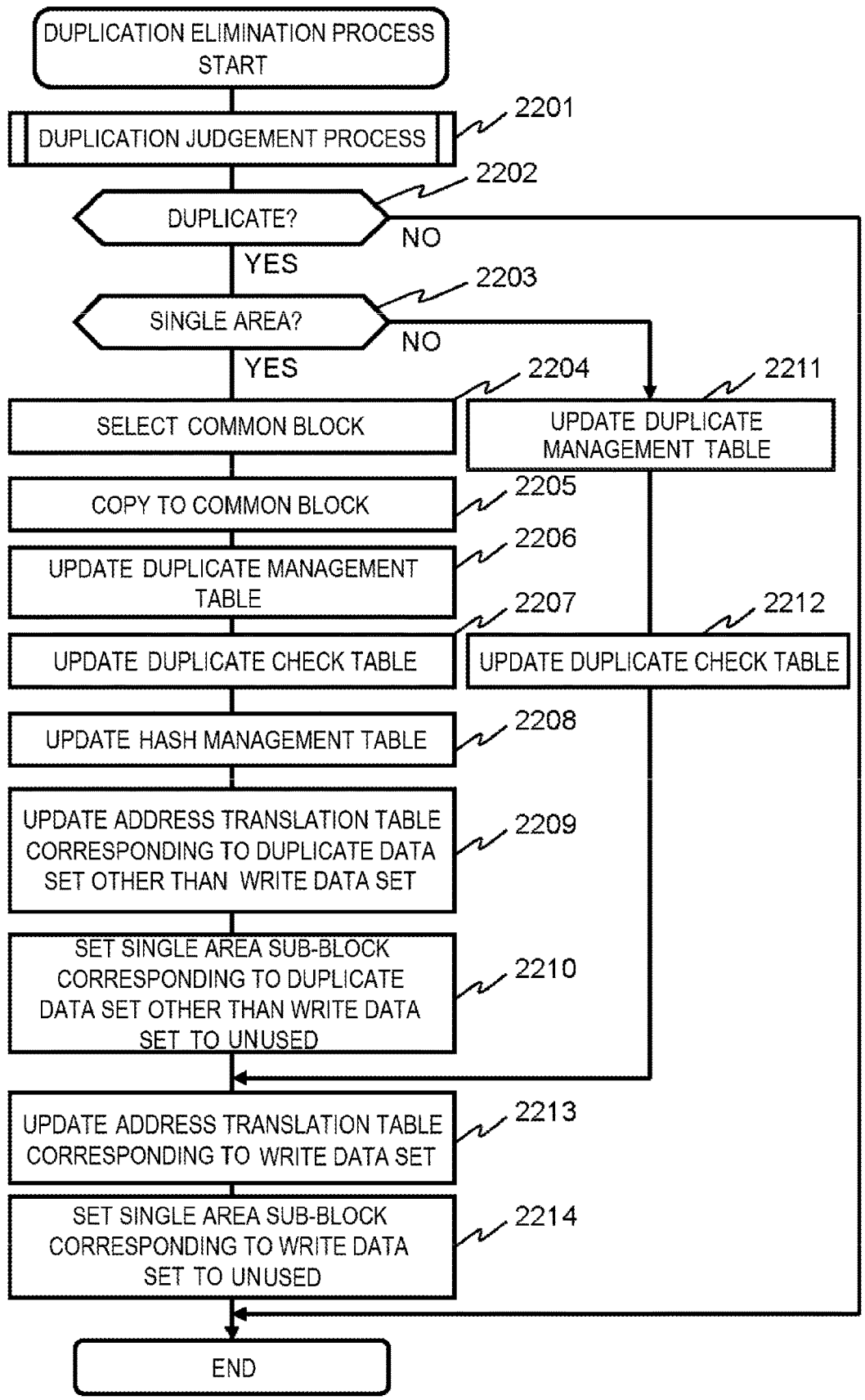
FIG. 22 is a diagram showing an example of a flow of de-duplication process.

FIG. 22 is a diagram showing an example of a flow of de-duplication process. De-duplication process is performed on the data set selected in step 2103 in FIG. 21. Below, in the description from FIG. 22 to FIG. 24, the data set selected in step 2103 will be referred to as "write data set", the write destination block of the write data set will be referred to as "write destination block", and the logical volume which includes the write destination block will be called "write destination volume".

The data amount reduction program 414 performs duplication judgment process on the write data set (step 2201), determines whether or not the write data sets are duplicated (step 2202). As a judgment result of step 2201, if the write data set is a single data set (non-duplicate data set) (step 2202: NO), the de-duplication process is terminated.

If it is determined in step 2201 that the write data set is a duplicate data set (step 2202: YES), the data amount reduction program 414 determines whether another duplicate data set that duplicates with the write data set exists in the single area 70 (step 2203).

Further, the write data set and another duplicate data set that duplicates with the write data set are collectively referred to as "duplicate data set" in the following description of FIG. 22. That is, in the following description of FIG. 22, the "duplicate data set" may be any of two or more data sets including a write data set.

If the duplicate data set is the data set that already exists in the single area 70, in any one of the step 2204 or step 2205, the compressed data set of the existing data set may be temporarily decompressed by the data amount reduction program 414 and the decompressed data set may also be a duplicate data set.

In addition, the judgment in step 2203 is based on, for example, whether the information of the comparison destination VOL #1505 corresponding to the write destination block coincides with the information of the VOL #801 of the VOL attribute 802 "provision", or whether the information of the VOL attribute 802 coincides with the information of "common" VOL #801.

If the information of the comparison destination VOL #1505 corresponding to the write destination block coincides with the information of the VOL #801 of which the information of the VOL attribute 802 is "provision", another duplicate data set exists in the single area 70, so that the judgment result of step 2203 is true (YES).

If the information of the comparison destination VOL #1505 corresponding to the write destination block coincides with the information of the VOL #801 of which the information of the VOL attribute 802 is "common", another duplicate data set exists in the common area 80, so that the judgment result of step 2203 is false (NO).

When the judgment result of the step 2203 is true (step 2203: YES), the data amount reduction program 414 proceeds to the process of step 2204. Then, the data amount reduction program 414 selects the common block 601 C whose information of the in-use flag 1802 is "unused" (step 2204).

Hereinafter, the common block 601 C selected in step 2204 is referred to as "object common block" and the common volume 501 C including the object common block is referred to as "object common volume".

The data amount reduction program 414 compresses the duplicate data set and additionally writes the compressed data set to the additional writing common page (the common page 51 C allocated to the additional writing volume 502 corresponding to the object common volume, in particular, the object common block) (step 2205).

The data amount reduction program 414 updates the duplicate management table 430, specifically, associates one or more block 601 corresponding to one or more duplicate data set to the object common block as a reference source (step 2206).

The data amount reduction program 414 updates the duplication check table 489, specifically, registers the number of the object common volume and the logical address of the object common block as the information of the storage destination VOL #1508 corresponding to the write destination block and the information of the storage destination VOL internal address 1509 (step 2207).

The data amount reduction program 414 updates the hash management table 429, for example, registers information of each of the hash value 1601 (a hash value of a duplicate data set), the registration flag 1602 ("completed"), the VOL #1603 (a number of an object common volume), and the VOL internal address 1604 (the logical address of the object common block) (step 2208).

The data amount reduction program 414 updates the address translation table 422 corresponding to the provision volume 501 P that stores a duplicate data set other than the write data set (step 2209).

In the updating of the address translation table 422, specifically, the information of the reference destination VOL #902 corresponding to the duplicate data set and the information of the reference destination VOL internal address 903 are changed to the object common volume number and the logical address of the object common block, and the information of the reference destination VOL type 905 corresponding to the duplicate data set is changed to "common".

The data volume reduction program 414 updates the sub-block management table 427 relating to the additional writing volume 502 corresponding to the provision volume 501 P which stores the duplicate data set other than the write data set, and specifically changes the information of the allocation flag 1303 corresponding to the sub-block which stores the compressed data set of the duplicate data set other than the write data set to "not allocated" (step 2210).

When the judgment result of step 2203 is false (step 2203: NO), the data amount reduction program 414 proceeds to step 2211. Then, the data amount reduction program 414 updates the duplicate management table 430, specifically, associates the write destination block as a new reference source to the common block 601 C which stores the duplicate data set (step 2211).

The data amount reduction program 414 updates the duplication check table 489, specifically, registers the logical address of the common block 601 C which stores the duplicate data set and the number of the common volume 501 C including the common block 601 C which stores the duplicate data set, as information of the storage destination VOL address 1509 corresponding to the write destination block and the information of the storage destination VOL #1508 (step 2212).

After step 2210 or step 2212, the data amount reduction program 414 updates the address translation table 422 corresponding to the write destination volume (step 2213).

In the updating of the address translation table 422, specifically, the information of the reference destination VOL #902 corresponding to the write destination block (write data set) and the information of the reference destination VOL internal address 903 are changed to the number of the common volume 501 C and the logical address of the common block 601 C, and the information of the reference destination VOL type 905 corresponding to the write destination block is changed to "common".

The data amount reduction program 414 updates the sub-block management table 427 relating to the additional writing volume 502 corresponding to the write destination volume if the compressed data set of the write data set is in the additional write single page, specifically, the allocation flag 1303 corresponding to the sub-block that stores the compressed data set of the write data set is changed to "not allocated" (step 2214).

In the embodiment, the de-duplication process is a process as a post process as described above, but in the case of a process as an in-process, for example, step 2214 in FIG. 22 may not be performed. This is because de-duplication is performed without additionally writing the compressed data set of the write data set (or without compressing the write data set).

Figure 23:
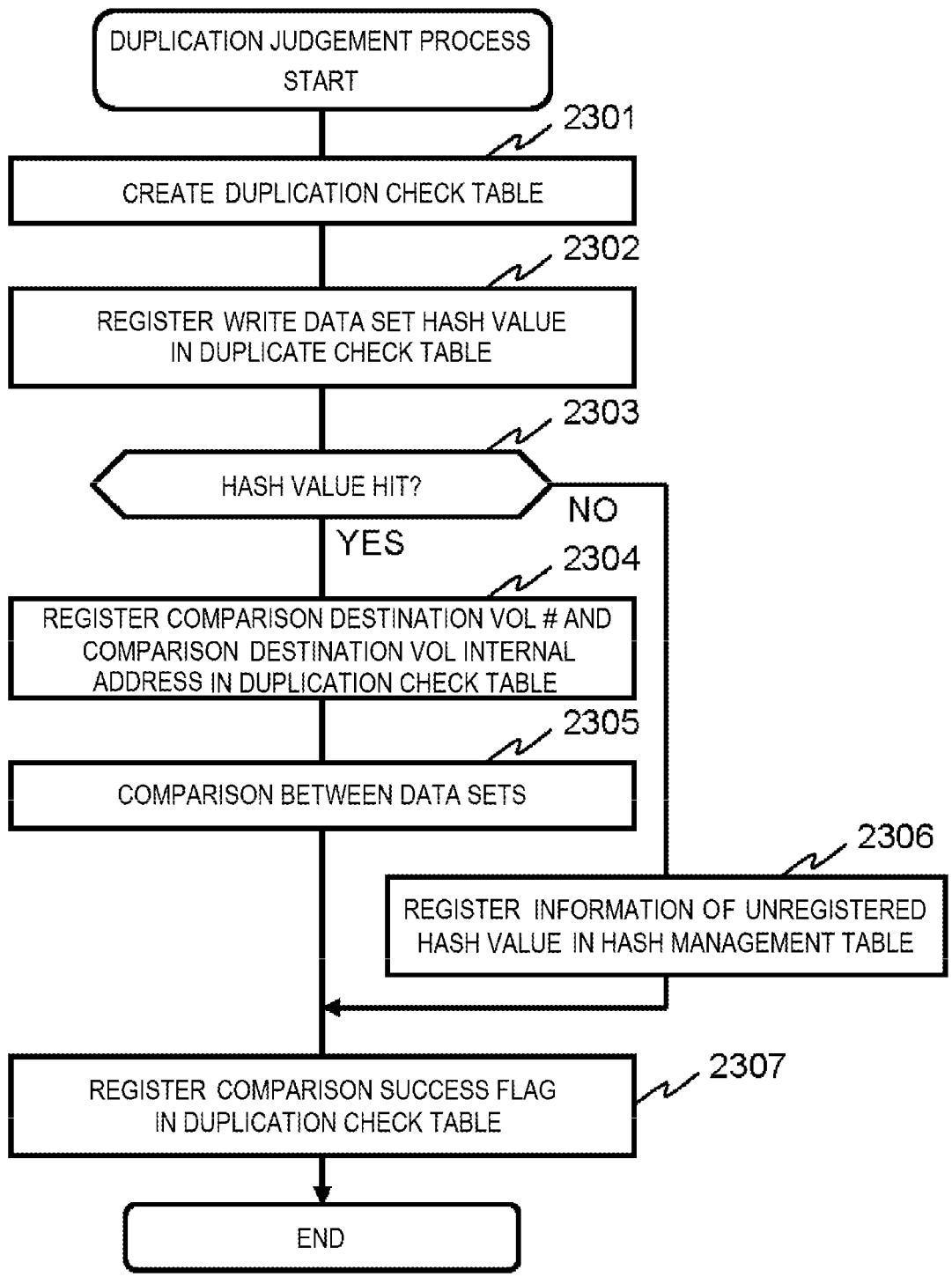
FIG. 23 is a diagram showing an example of a flow of duplication judgment process.

FIG. 23 is a diagram showing an example of a flow of duplication judgment process. The data amount reduction program 414 creates a duplication check table 489 which relates to the write data set (step 2301).

When the de-duplication process is performed in units of predetermined process object data such as I/O units. As a result, when the data includes a plurality of data sets, the duplication check table 489 has a plurality of entries respectively corresponding to the plurality of data sets.

The data amount reduction program 414 registers the hash value of the write data set as the information of the hash value 1503 corresponding to the write destination block (step 2302).

The data amount reduction program 414 determines whether or not a hash value coincides with the hash value registered in step 2302 is registered in the hash management table 429, that is, whether or not a hash value hit occurs (step 2303).

When the judgment result of step 2303 is true (step 2303: YES), the data amount reduction program 414 updates the duplication check table 489, specifically, registers the information of the VOL #1603 corresponding to the hash value coinciding with the hash value registered at step 2302 and information of VOL internal address 1604 as the information of the comparison destination VOL #1505 corresponding to the write destination block and the information of the comparison destination VOL internal address 1506 (step 2304).

The data amount reduction program 414 compares the write data set with the data set acquired based on the information of the comparison destination VOL #1505 and the information of the comparison destination VOL internal address 1506 (for example, decompressed data set) (step 2305). The comparison in step 2305 may be a comparison between the compressed data sets.

When the judgment result of step 2303 is false (step 2303: NO), the data amount reduction program 414 updates the hash management table 429, specifically, registers information of each of the hash value 1601 (a hash value of a write data), the registration flag 1602 ("completed"), the VOL #1603 (a number of the write destination volume), and the VOL internal address 1604 (the logical address of the write destination block) in a new entry (step 2306).

After step 2305 or step 2306, the data amount reduction program 414 updates the duplication check table 489, specifically, information of the comparison success flag 1507 corresponding to the write destination block (step 2307).

For example, when a coincidence is obtained in the comparison between the data sets in step 2305, "success" is registered as the information of the comparison success flag 1507. "Failure" is registered as the information of the comparison success flag 1507 when a coincidence is not obtained in comparison between the data sets in step 2305 or when step 2306 is performed.

Figure 24:
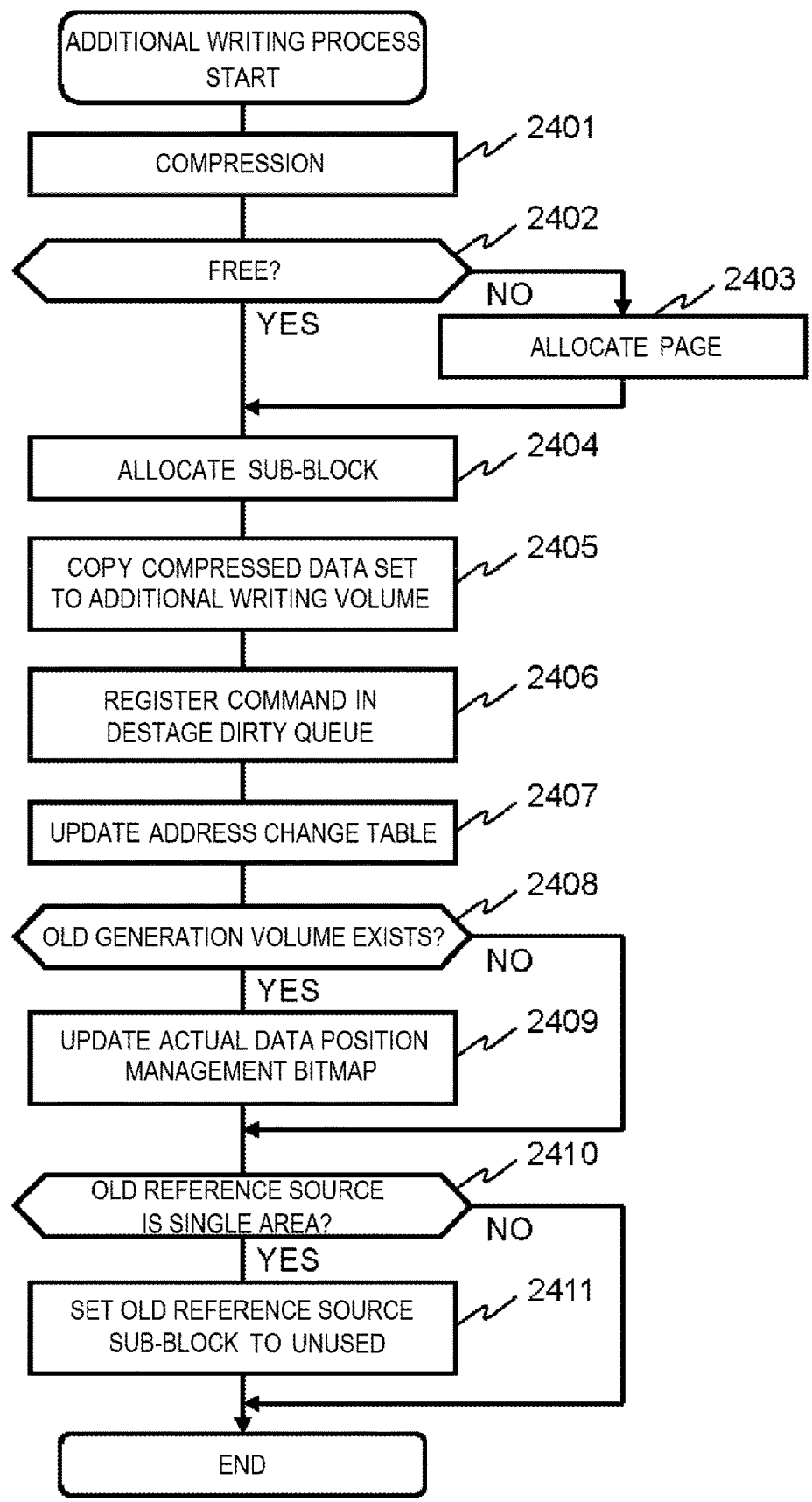
FIG. 24 is a diagram showing an example of a flow of additional writing process.

FIG. 24 is a diagram showing an example of a flow of additional writing process. The additional writing process is performed on the data set selected in step 2103 in FIG. 21. The data amount reduction program 414 compresses the write data set and stores the compressed data set in, for example, the cache memory 402 (step 2401).

The data amount reduction program 414 judges whether or not the free capacity equal to or larger than the size of the compressed data set exists in the page 51 allocated to the additional writing volume 502 corresponding to the write destination volume (step 2402).

In order to make the judgment, for example, the address registered as the information of the additional writing destination address 1402 corresponding to the additional writing volume 502 is specified, and with the number of the page 51 assigned to the area to which the specified address belongs as the key, the sub-block management table 427 corresponding to the additional writing volume 502 may be referred to.

When the judgment result in step 2402 is false (step 2402: NO), the data amount reduction program 414 allocates an unallocated Page 51 to the additional writing volume 502 corresponding to the write destination volume (step 2403).

When the judgment result of step 2402 is true (step 2402: YES), or after step 2403, the data amount reduction program 414 allocates the sub-block to be the additional writing destination (step 2404).

The data amount reduction program 414 copies the compressed data set of the write data set to the additional writing volume 502, for example, copies the compressed data set to the area for the additional writing volume 502 (area in the cache memory 402) (step 2405).

The data amount reduction program 414 registers the write command of the compressed data set in the destage dirty queue (step 2406), and updates the address translation table 422 corresponding to the write destination volume (step 2407).

In the update of the address translation table 422, specifically, the information of the reference destination VOL #902 corresponding to the write destination block and the information of the reference destination VOL internal address 903 are changed to the number of the additional writing volume 502 C and the logical address of the sub-block allocated in step 2404, and the information of the reference destination VOL type 905 corresponding to the write destination block is changed to "single".

The data amount reduction program 414 judges whether or not there exists an old generation volume related to the write destination volume (step 2408). The old generation volume is the replication source volume when a replicate of the logical volume is acquired.

The judgment in step 2408 may be determined based on whether or not the parent generation VOL #3402 is set by referring to the entry in which the number of the write destination volume coincides with the information of the VOL #3401 in the generation management table 432.

When the judgment result of step 2408 is true (step 2408: YES), among the entries in which the number of the write destination block of the actual data position management bitmap 433 coincides with the information of the VOL internal address 3501, the in-use flag 3502 for each generation VOL #corresponding to the writing destination volume is updated to "yes" (step 2409).

When the judgment result of step 2408 is false (step 2408: NO), or after step 2409, the data amount reduction program 414 determines whether or not the reference source of the old sub-block (old reference source) is the logical address of the write destination block (that is, whether it is the single area 70) (step 2410).

The "old sub-block" is a sub-block that stores the compressed data set before update of the compressed data set of the write data set. That is, the judgment in step 2408 is a judgment of whether the write data set is the updated data set of the data set in the single area 70, or the updated data set of the data set in the common area 80.

When the judgment result of step 2408 is true (step 2408: YES), the data amount reduction program 414 updates the information of the allocation flag 1303 corresponding to the old sub-block to "unassigned" (step 2409).

Figure 25:
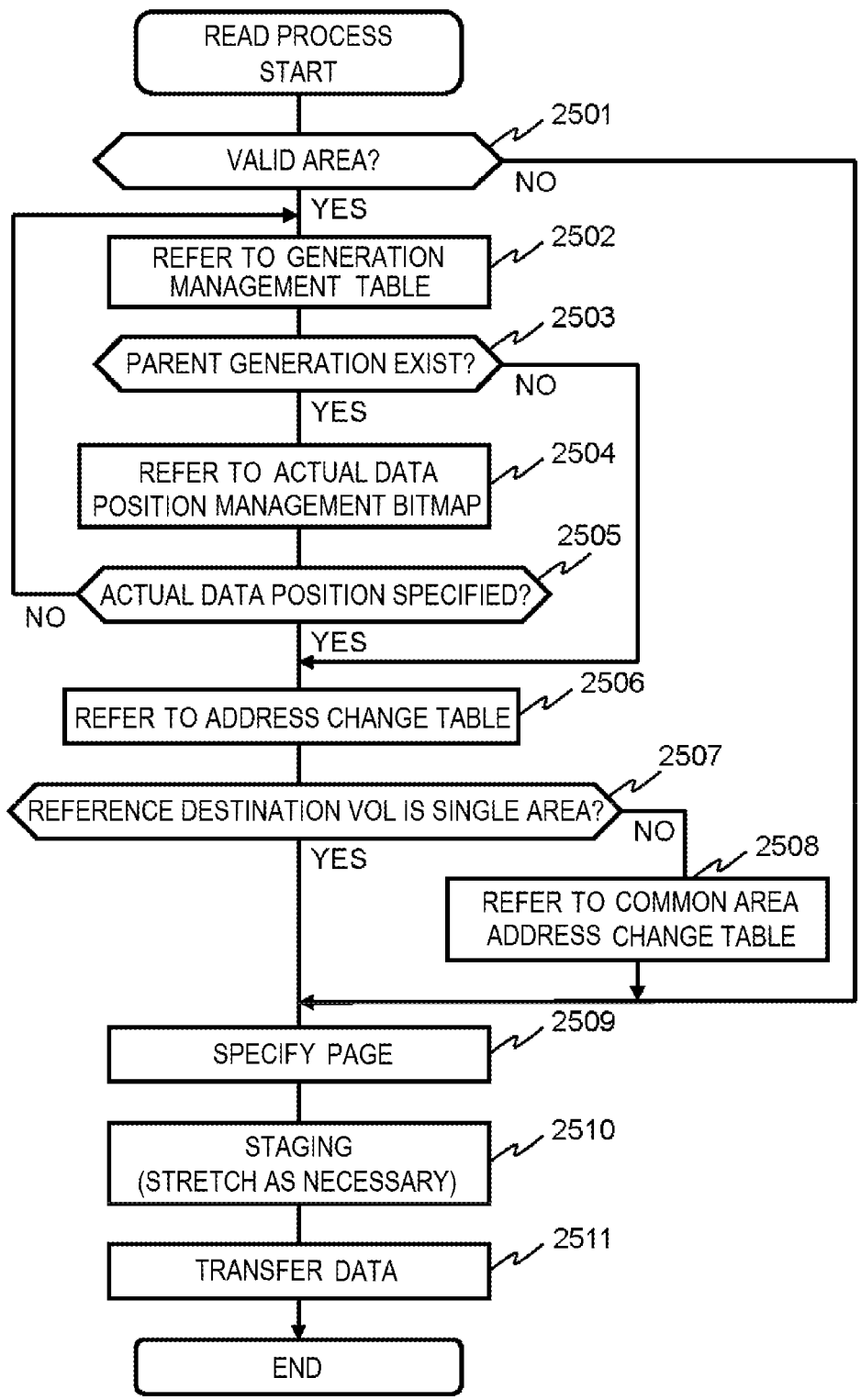
FIG. 25 is a diagram showing an example of a flow of read process.

FIG. 25 is a diagram showing an example of a flow of read process. The read process is performed when a read request to the logical volume 501 is accepted.

Based on the valid area management table 424, the read program 411 judges whether or not the read source according to the read request belongs to the valid area (step 2501), when the judgment result of step 2501 is true (step 2501: YES), the generation management table 432 is referred to (step 2502).

The read program 411 refers to an entry in which the number of the read source provision volume 501 P coincides with the information of the VOL #3401 and determines whether the information of the parent generation VOL #3402 is set or not (step 2503).

When the judgment result of step 2503 is true (step 2503: YES), which means that a replication source of the read source logical volume 501 exists, and since actual data does not necessarily exist in the logical volume 501, the read program 411 refers to an entry holding information corresponding to the read destination block in the VOL internal address 3501 in the actual data position management bitmap 433 (step 2504).

The read program 411 refers to the in-use flags of the generation VOL # corresponding to the read destination volume and the two in-use flags of the in-use flag of the Generation VOL # corresponding to the parent generation VOL #3402 referred to at step 2502 from the in-use flag 3502 for each generation VOL #, and judges whether the actual data exists (whether the position of actual data can be specified) or not (step 2505).

If any one of the two in-use flags referred to in the judgment is ("yes"), or both are ("yes"), it means that the volume (position) where the actual data exists can be specified (step 2505: YES). If both of the two in-use flags referred to in the judgment are ("yes"), the actual data exists in the volume of the generation VOL # corresponding to the read destination volume.

If both of the two in-use flags referred to in the judgment are ("none"), it means that the volume where the actual data exists cannot be specified (step 2505: NO). When the judgment result of step 2205 is false (step 2205: NO), the read program 411 returns to step 2502.

Then, the read program 411 refers to the entry of VOL #3401 corresponding to the parent generation volume of the Generation management table 432 (step 2502), and thereafter, repeats the process from step 2502 to step 2505 until the volume where the actual data exists can be specified.

When the judgment result of step 2503 is false (step 2503: NO), which means there exists no duplication in the read source logical volume 501, the read program 411 proceeds to step 2506.

When the judgment result of step 2503 is false (step 2503: NO) or the judgment result of step 2505 is true (step 2505: YES), since the volume where the actual data exists can be specified, the read program 411 refers to the address translation table 422 corresponding to the specified volume (step 2506).

The read program 411 specifies each block constituting the specified volume based on the address translation table 422 and performs the following process for each specified block.

The read program 411 determines whether the information of the reference destination VOL type 905 corresponding to the specified block is "single" or not (step 2507).

When the judgment result in step 2507 is false (step 2507: NO), the address translation table 422 corresponding to the common volume 501 C is referred based on the information of the reference destination VOL #902 and the reference destination VOL internal address 903 corresponding to the specified block (step 2508).

When the judgment result of step 2507 is true (step 2507: YES), or after step 2508, the read program 411 specifies the page 51 corresponding to the specified block based on the page translation table 425 (step 2509), reads the compressed data set corresponding to the specified block from the specified page 51, decompresses the compressed data set, and stores the decompressed data set in the cache memory 402 (step 2510).

When the judgment result of step 2501 is true (step 2501: YES), if the process up to step 2510 is completed for each block constituting the read source volume, data conforming to the read request is stored in the cache memory 402, so that the read program 411 transfers the stored data to the dispatch source of the read request (step 2511).

When the judgment result of step 2501 is false (step 2501: NO), the read program 411 specifies the page 51 allocated to the volume of the read source based on the page translation table 425 (step 2509), reads the data of the read object from the specified Page 51 (step 2510), and transfers the read data to the sending source as a read request (step 2511).

Figure 36:
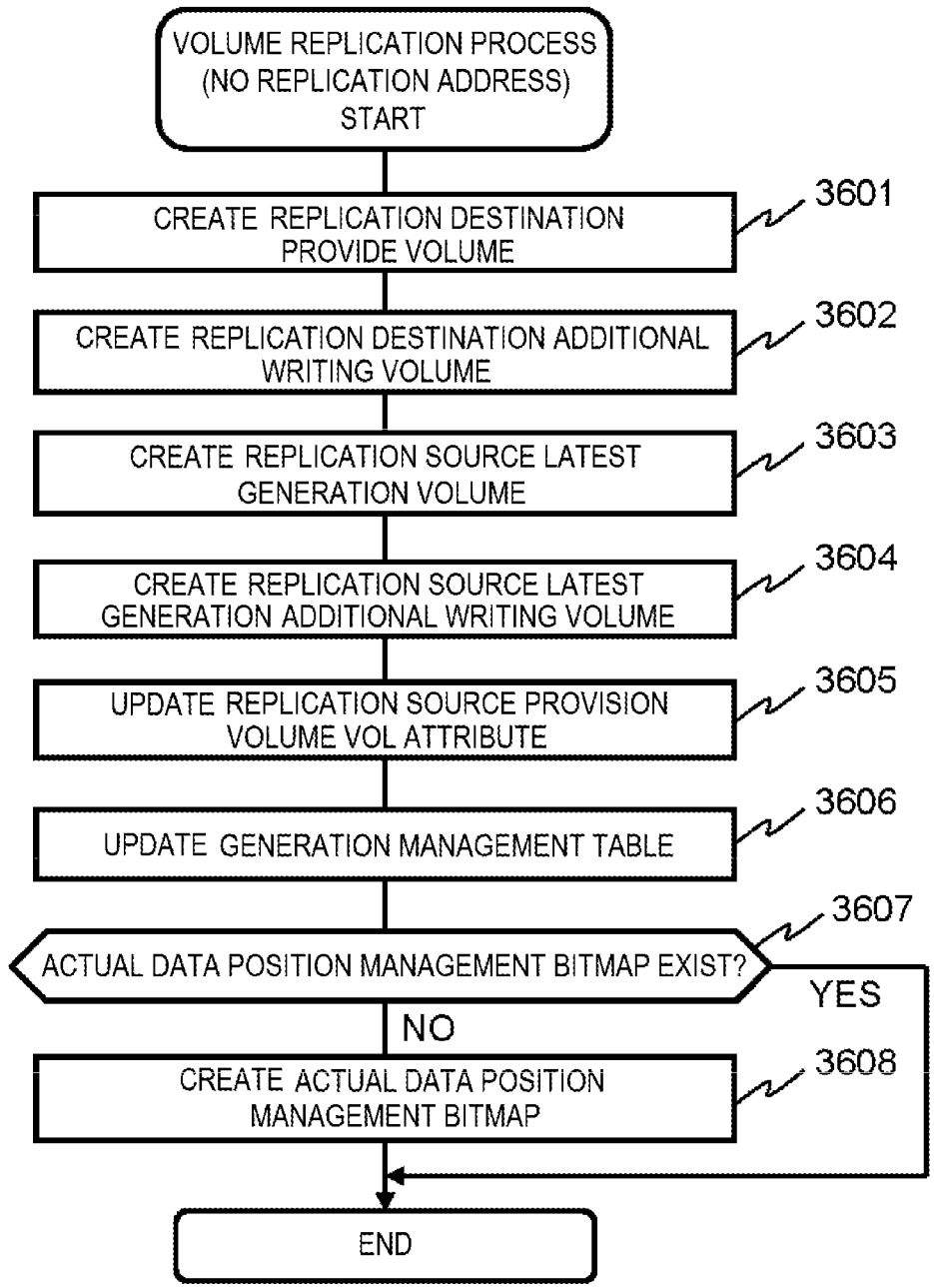
FIG. 36 is a diagram showing an example of a flow of a volume replicate process (no replicate address).

FIG. 36 is a diagram showing an example of the flow of the provision volume replication process. The process in FIG. 36 is an example in particular where the volume of the replication destination does not exist before the process, and the volumes of the replication source and the replication destination belong to the valid area. The provision volume replication process is performed, for example, when a volume replicate request designating any of the provision volumes 501 P accepted.

The volume replication control program 418 creates the replication destination provision volume 501 S (step 3601), specifically, sets the information of the number of the replication destination provision volume 501 S in the VOL #801 of the VOL management table 421, and the VOL attribute 802 to "provision", the VOL capacity 803, and the pool #804, respectively.

The volume replication control program 418 creates the additional writing volume 502 S corresponding to the replication destination provision volume 501 S (step 3602), specifically, sets the information of the number of the replication destination additional writing volume 502 S in the VOL #801 of the VOL management table 421, the VOL attribute 802 to "additional writing", the VOL capacity 803, and the pool #804, respectively.

The volume replication control program 418 creates the latest generation provision volume 501 Pa of the replication source (step 3603), specifically, sets the information of the number of the replication source latest generation provision volume 501 Pa in the VOL #801 of the VOL management table 421, the VOL attribute 802 to "providing", the VOL capacity 803, and the pool #804, respectively.

The volume replication control program 418 creates the additional writing volume 502 Pa corresponding to the replication source latest generation provision volume 501 Pa (step 3604), specifically, sets the information of the number of the replication source additional writing volume 502 Pa of the latest generation in the VOL #801 of the VOL management table 421, the VOL attribute 802 to "additional writing", the VOL capacity 803, and the pool #804, respectively.

The volume replication control program 418 updates the replication source provision volume 501 P to a duplicate single volume (step 3605), specifically, updates the VOL attribute 802 of the entry corresponding to the replication source provision volume 501 P of the VOL management table 421 to "duplicate single".

The volume replication control program 418 updates the Generation management table 432 (step 3606), specifically, sets the number of, the replication source provision volume 501 Pa of the latest generation and the replication destination provision volume 501 S to the child generation VOL #3403 of the entry corresponding to the replication source provision volume 501 P.

In addition, the number of the replication source provision volume 501 P is set to the parent generation VOL #3402 of the replication source latest generation provision volume 501 Pa and the parent generation VOL #3402 of the replication destination provision volume 501 S.

The volume replication control program 418 judges whether or not the actual data position management bitmap 433 corresponding to the replication volume group including the replication source provision volume exists (step 3607).

When the judgment result of step 3607 is false (step 3607: NO), since the actual data position management bitmap 433 does not exist, the volume replication control program 418 creates the actual data position management bitmap 433 (step 3608).

In creating the actual data position management bitmap 433, the volume replication control program 418 sets the VOL # corresponding to the replication source provision volume 501 P as the oldest generation, and updates the oldest among the in-use flags 3502 for each generation VOL # ("yes"), and updates one or more flags of the other generations to ("none").

Figure 37:
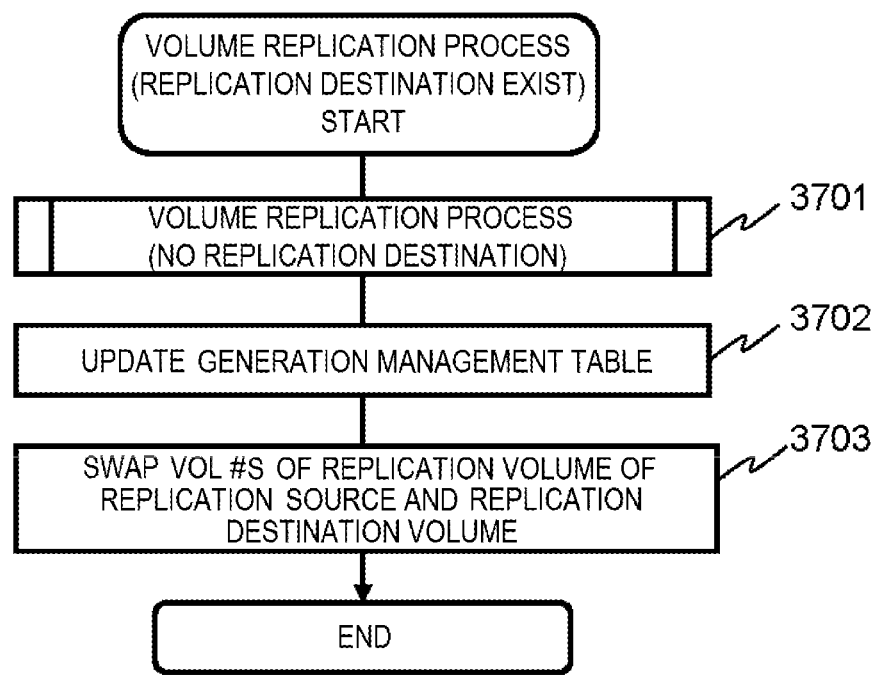
FIG. 37 is a diagram showing an example of a flow of a volume replicate process (replicate address exists).

FIG. 37 is a diagram showing an example of the flow of the provision volume replication process, and the process in FIG. 37 is an example in particular where the volume of the replication destination exists, and the volumes of the replication source and the replication destination belong to the valid area. The provision volume replication process is performed, for example, when receiving a volume duplication request designating any of the provision volume 501 P as the replication source and any of the provision volumes 501 S as the replication destination.

The volume replication control program 418 creates a replicate volume as a replication of the replication source provision volume 501 P (step 3701). The replication volume of the replication source provision volume 501 P is created by the process shown in FIG. 36.

The volume replication control program 418 updates the generation management table 432 (step 3702). More specifically, in order to swap the replication volume created in step 3701 and the replication source provision volume 501 S, the parent generation VOL #3402 of the entry corresponding to the replication volume and the information of the parent generation VOL #3402 of the entry corresponding to the replication destination provision volume 501 S are exchanged.

The volume replication control program 418 swaps the number of the replication volume and the number of the replication destination provision volume 501 S (step 3703). Specifically, the VOL #801 corresponding to the replication volume of the VOL management table 421 and the information of the VOL #801 corresponding to the replication destination provision volume 501 S are exchanged.

Figure 26:
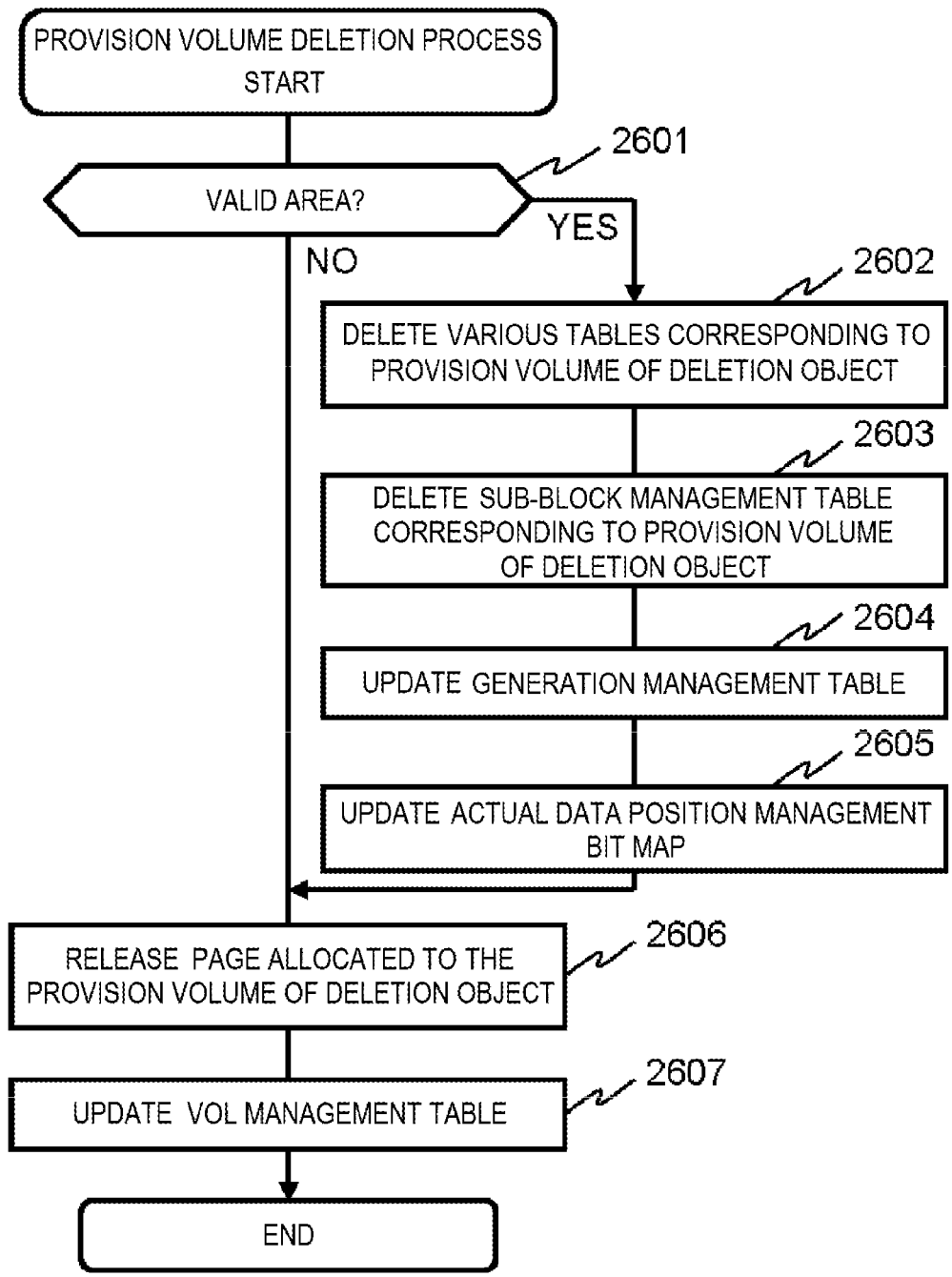
FIG. 26 is a diagram showing an example of a flow of provision volume deletion process.

FIG. 26 is a diagram showing an example of a flow of provision volume deletion process. The provision volume deletion process is performed, for example, when a volume deletion request designating any of the provision volumes 501 P is accepted.

The VOL management program 415 determines whether or not the deletion object provision volume 501 P belongs to the valid area based on the valid area management table 424 (step 2601).

For the area where the judgment result in step 2601 is true (step 2601: YES), the VOL management program 415 deletes various tables corresponding to the deletion object provision volume 501 P (specifically, the address translation table 422, the valid area management table 424, and the page translation table 425) (step 2602).

In addition, the VOL management program 415 also deletes the sub-block management table 427 corresponding to the deletion object provision volume 501 P (step 2603).

The VOL management program 415 updates the generation management table 432 (step 2604), specifically, refers to the number of the parent generation VOL #3402 of the volume corresponding to the deletion object provision volume 501 P, clears the child generation VOL # of the entry that holds a number coinciding with the referenced number in VOL #3401. In addition, the entry of the deletion object provision volume 501 P is deleted.

The VOL management program 415 updates the actual data position management bitmap 433 (step 2605), specifically, updates the in-use flag of the column corresponding to the deletion object provision volume 501 P in the in-use flag 3502 of each generation VOL # to ("none").

For the area (step 2601: NO) in which the judgment result of step 2601 is false, and after step 2605, the VOL management program 415 releases the page allocated to the deletion object provision volume 501 P to unassigned (step 2606).

Here, the "page allocated to the deletion object provision volume 501 P" refers to one or more pages 51 directly allocated to the deletion object provision volume 501 P and one or more pages 51 indirectly allocated to the deletion object provision volume 501 P (one or more pages 51 assigned to the additional writing volume 502 corresponding to the deletion object provision volume 501 P).

The VOL management program 415 updates the VOL management table 421 (st 2607), specifically, deletes the entry corresponding to the deletion object provision volume 501 P of the VOL management table 421.

As described above, in the case where the provision volume is the deletion object, for each of one or more pages, the one or more paces directly or indirectly allocated to the provision volume can be released without checking whether or not the page is referred to from any other area, and without checking whether any area in the provision volume refers to the common area 80.

Also, when the volume deletion is executed by the VOL management program 415, the volume to be deleted is only a volume whose VOL attribute is "provision", and a volume of additional writing volume whose VOL attribute corresponds to "provision" (a volume with the VOL attribute "additional writing"). In the embodiment, the duplicate single volume (a volume with the VOL attribute "duplicate single") that is not provided to the server system 201 is not deleted.

Figure 27:
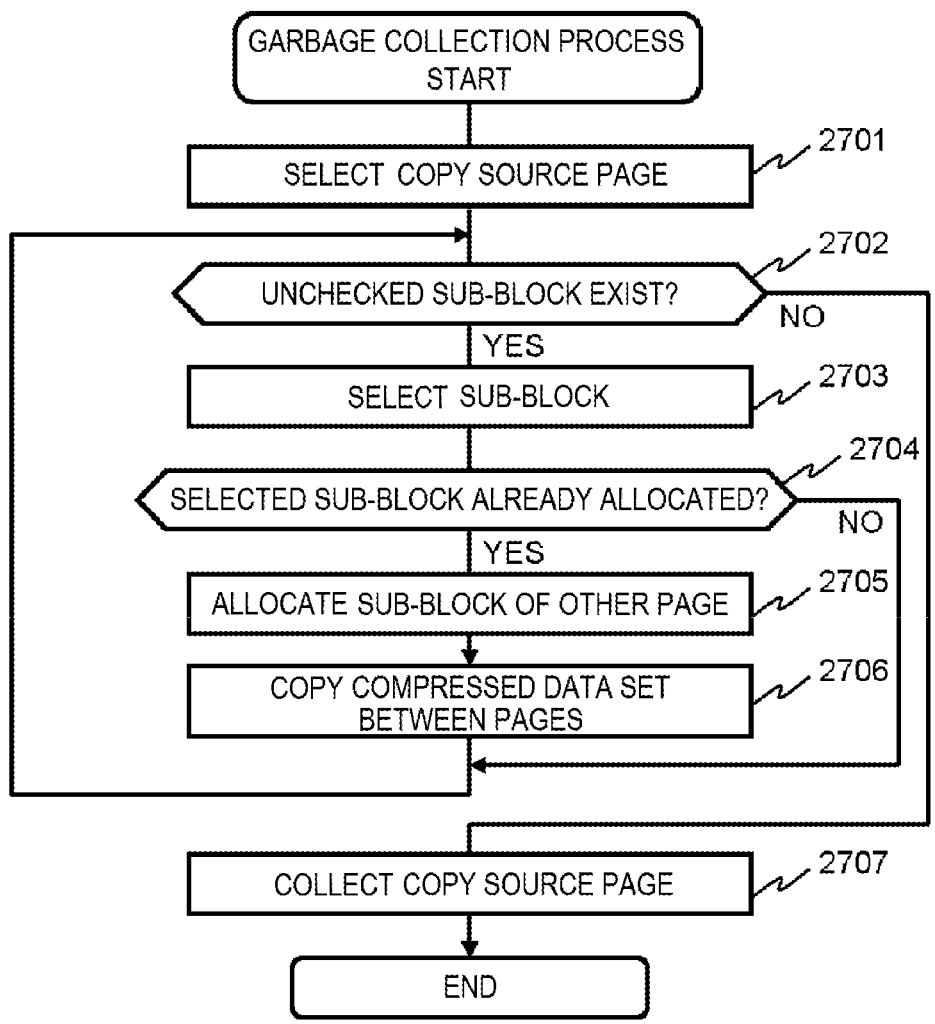
FIG. 27 is a diagram showing an example of a flow of garbage collection process.

FIG. 27 is a diagram showing an example of a flow of garbage collection process. The garbage collection process in FIG. 27 is a process of collecting an additional writing page, for example, may be started periodically, or may be started in the case where the pool capacity management program 416 detects that the ratio of the capacity of the unallocated page 51 to the capacity of the pool 503 becomes less than the predetermined value.

The pool capacity management program 416 selects the pace 51 (copy source page) that becomes the copy source in the garbage collection process (step 2701). The pool capacity management program 416 refers to the sub-block management table 427 corresponding to the additional writing volume 502 to which the copy source page is allocated, and judges whether or not there is an unchecked sub-block 602 in the garbage collection process (step 2702).

When the judgment result in step 2702 is true (step 2702: YES), the pool capacity management program 416 proceeds to step 2703 and selects one sub-block 602 out of the unchecked sub-blocks 602 (step 2703).

When the allocation flag 1303 of the sub-block 602 selected in step 2703 is "allocated" (step 2704: YES), the pool capacity management program 416 allocates the sub-block 602 in the copy destination page 51 (step 2705), from the sub-block 602 selected in step 2703, the post-compression data set is copied to the sub-block allocated in step 2705 (step 2706).

In step 2706, the reference source of the copy source sub-block 602 becomes the copy destination sub-block 602 as a reference destination instead of the copy source sub-block 602. Then, after the step 2706, the pool capacity management program 416 returns to the step 2702.

When the judgment result of step 2702 is false (step 2702: NO), in other words, when all the valid compressed data sets in the copy source page are copied to the copy destination page 51, the pool capacity management program 416 collects the copy source page, that is, the information of the allocation flag 1202 of the copy source page is changed to "not allocated" (step 2707).

As described above, in the garbage collection process of the additional writing page, the reference destination is updated in step 2706, however, if the additional page is a single page, the data set copied is always compressed data set of the single data set. Therefore, the reference source of the copy source sub block 602 is always one.

For this reason, for each sub-block 602 of the copy source, updating of the reference destination may be performed only for one reference source. Therefore, the garbage collection process of the additional writing single page is made more efficient.

In addition, even if the additional writing page is a duplicate single page that is indirectly referred to from the replication volume, the data set to be copied is the compressed data set of the common data set, but the reference source of the copy source sub-block 602 is always one.

For this reason, for each sub-block 602 of the copy source, updating of the reference destination may be performed only for one reference source. Therefore, the garbage collection process of the additional writing duplicate single page is also made more efficient.

Figure 28:
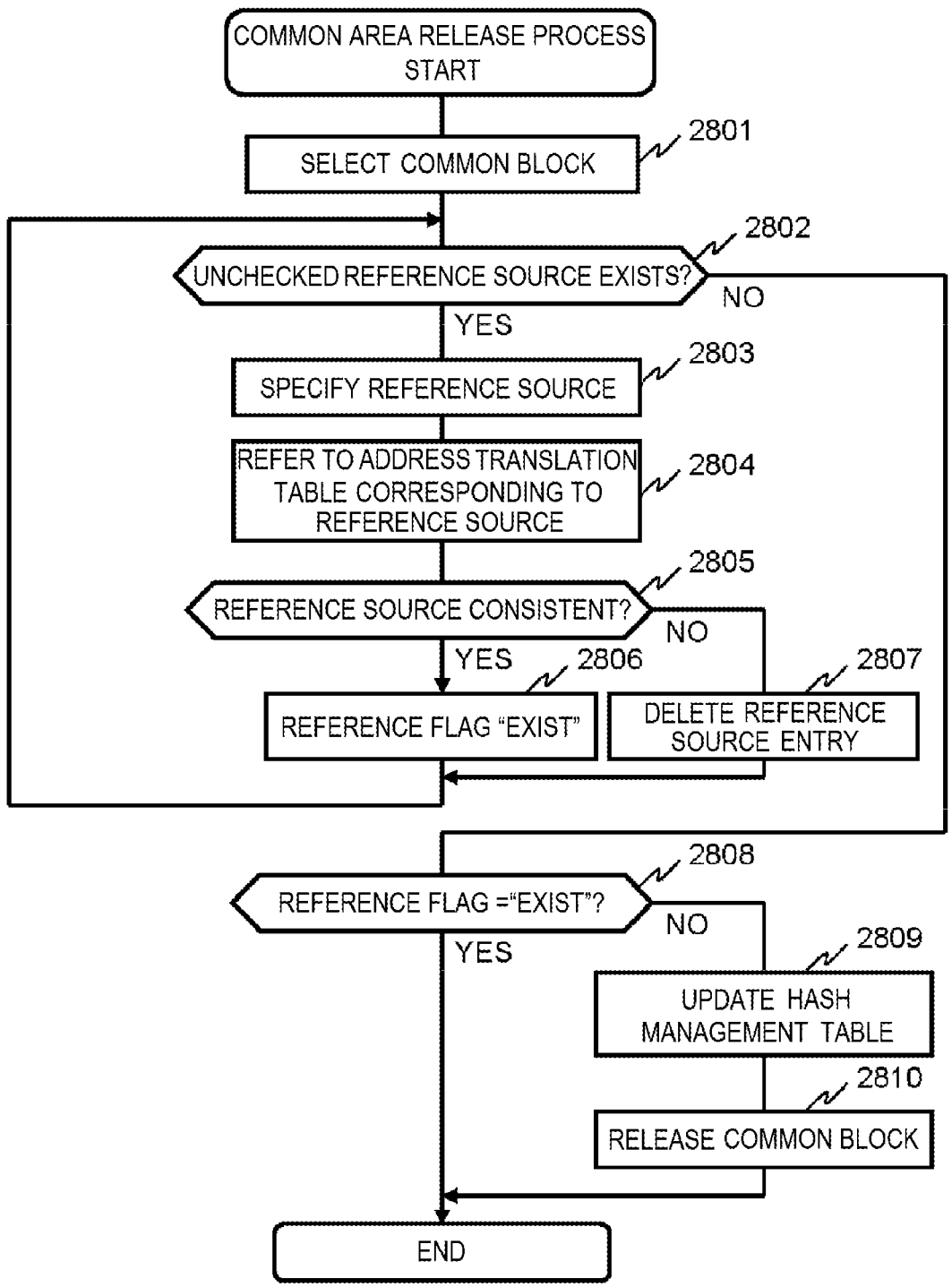
FIG. 28 is a diagram showing an example of a flow of a common area release process.

FIG. 28 is a diagram showing an example of a flow of a common area release process. The common area release process is performed periodically, for example. In the common area release process, the common area check table 434 corresponding to the common volume 501 C of the process object may be created by the common area release program 417, or may be prepared in advance in the common memory 404.

The common area release program 417 selects one of the common blocks 601 C (step 2801). The common block 601 C selected in step 2801 is referred to as "object common block". The common area release program 417 refers to the duplicate management table 430 and judges whether there is even one reference source that refers to the object common block (step 2802).

When the judgment result of step 2802 is true (step 2802: YES), the common area release program 417 proceeds to step 2803, selects any of the reference source entries corresponding to the object common block from the duplicate management table 430, and specifies the volume number and the logical address of the reference source from the selected reference source entry (step 2803).

The common area release program 417 specifies the information of the reference destination VOL #902 corresponding to the logical address specified in step 2803 and the reference destination VOL internal address 903 from the address translation table 422 corresponding to the volume number specified in step 2803 (step 2804).

If the reference destination (the block 601 specified by the information of the reference destination VOL #902 and the reference destination VOL internal address 903) specified in step 2804 coincides with the object common block (step 2805: YES), the common area release program 417 sets the information of the reference flag 1902 corresponding to the object common block to ("yes") (step 2806).

On the other hand, if the reference destination specified in step 2804 does not coincide with the object common block (step 2805: NO), the common area release program 417 deletes the reference source entry specified in step 2803 from the reference source entry corresponding to the object common block (step 2807).

When there are a plurality of reference source entries whose reference source is the same provision volume 501 P in the object common block, for a plurality of logical addresses respectively represented by a plurality of reference source entries corresponding to the same provision volume 501 P, together, steps 2803 through 2807 may be performed.

When the judgment result in step 2802 is false (step 2802: NO), whether one or more reference source entry corresponding to the object common block have been executed from step 2803 to step 2807, or there is no reference source entry in the object common block. In the case, the common area release program 417 judges whether or not the information of the reference flag 1902 corresponding to the object common block is "yes" (step 2808).

In the case where the judgment result of step 2808 is false (step 2808: NO), in other words, when the information of the reference flag 1902 corresponding to the object common block is ("none"), since there is no even one reference source that sets the object common block as the reference destination, the common area release program 417 performs step 2809 to step 2810.

In other words, the common area release program 417 updates the hash management table 429 (step 2809), specifically, updates the information of the registration flag 1602 to ("none") regarding the entries through which the information corresponding to the object common block is stored in VOL #1603 and VOL internal address 1604 (step 2809).

Also, the common area release program 417 releases the object common block to unused, specifically, updates the information of the in-use flag 1802 corresponding to the object common block to "unused" (step 2810).

When the judgment result of step 2808 is true (step 2808: YES), step 2809 to step 2810 are not performed. This is because at least one reference source that sets the object common block as the reference destination exists.

According to the above common area release process, it is possible to detect the common block 601 C from which the reference source no longer exists, and it is possible to release the detected common block 601 C to unused. Therefore, it is possible to increase the free capacity (the number of free blocks) of the common volume 501 C.

Figure 38:
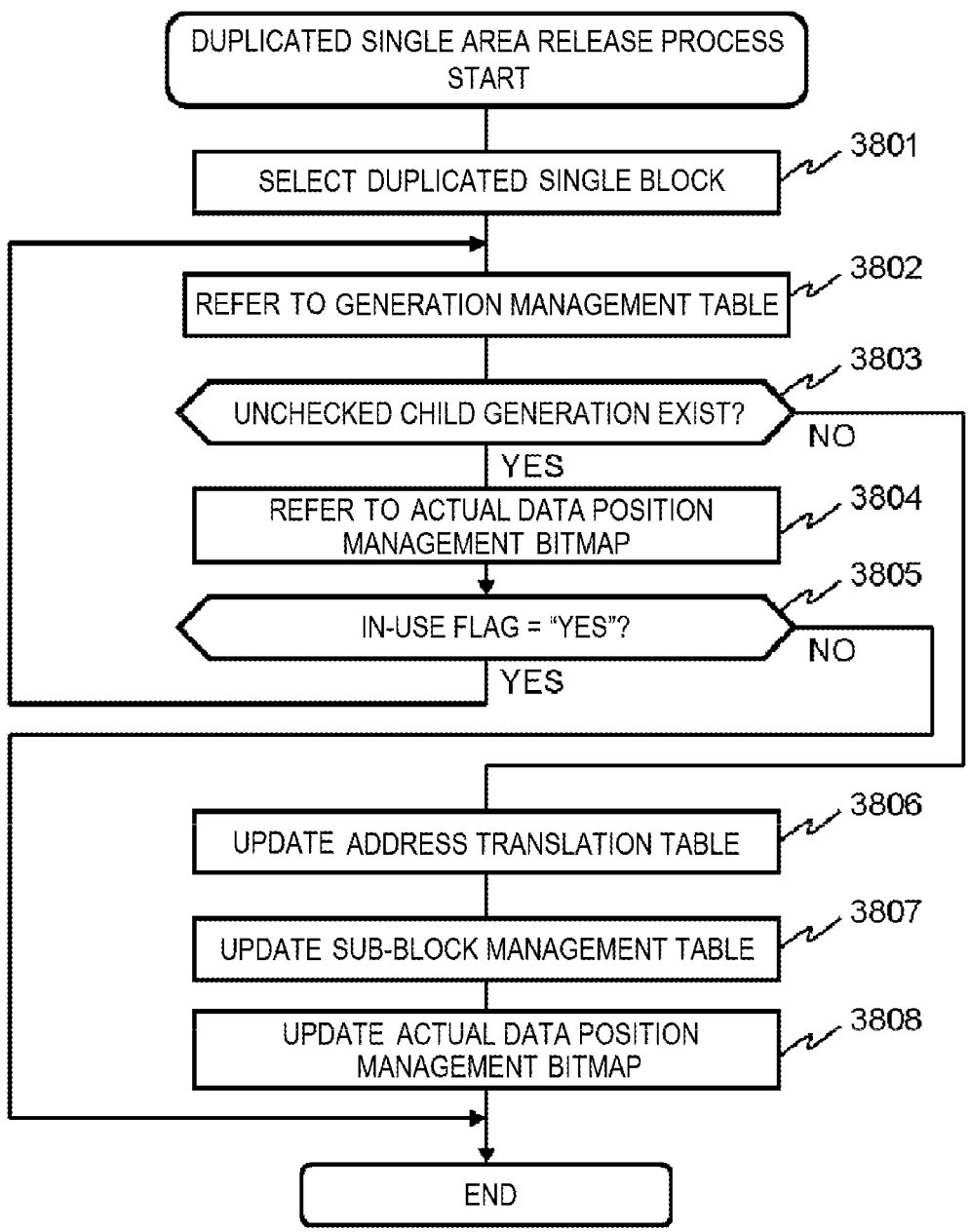
FIG. 38 is a diagram showing an example of a flow of duplication single area release process.

FIG. 38 is a diagram showing an example of the flow of the duplicate single area release process. The duplicate single area release process is performed periodically, for example. In the duplicate single area release process, a duplicate single volume (provision volume 501 P) is set as the process object. The duplicate single volume as the process object is referred to as "object duplicate single volume".

The duplicate single area release program 419 selects any duplicate single block (provision block 601 P) (step 3801). The duplicate single block selected in step 3801 is referred to as "object duplicate single block".

The duplicate single area release program 419 refers to an entry that holds information corresponding to the object duplicate single volume of the generation management table 432 in VOL #3401 (step 3802), and determines whether or not the information of the child generation VOL #3403 of the referred entry is set (step 3803).

When the judgment result of step 3803 is true (step 3803: YES), the duplicate single area release program 419 refers to the information of the in-use flag 3502 for each generation VOL # and the information corresponding to the information of the child generation VOL #3403 referred to in step 3802 among the entries that holds the information corresponding to the object duplicate single block in the VOL internal address 3501 of the actual data position management bitmap 433 (step 3804).

When the information of the in-use flag 3502 for each reference generation VOL # is ("yes") (step 3805: YES), since the object duplicate single block is not referred to from the child generation volume, the duplicate single area release program 419 returns to step 3802 in order to check whether the object duplicate single block is referred from a volume of a newer generation.

When the judgment result of step 3803 is false (step 3803: NO), since the object duplicate single block is not referred to from the volumes of one or more child generations of the object duplicate single volume, the duplicate single area release program 419 is performed from step 3806 to step 3808.

That is, the duplicate single area release program 419 releases the object duplicate single block to be unused, specifically, deletes the entry corresponding to the object duplicate single block of the address translation table 422 (step 3806).

In addition, the duplicate single area release program 419 changes the information of the allocation flag 1303 of the entry corresponding to the object duplicate single block in the sub block management table 427 to "not allocated" (step 3807).

Further, the duplicate single area release program 419 updates the actual data position management bitmap 433, specifically, updates the in-use flag 3502 for each generation VOL # of the entry corresponding to the object duplicate single block to ("none") (step 3808).

When the judgment result of step 3805 is false (step 3605: NO), the object duplicate single block is referred to from the volume of the child generation, so there is no object to release.

According to the above common area release process, it is possible to detect a duplicate single block in which the reference source no longer exists, and to release the detected duplicate single block to be unused. Therefore, it is possible to increase the free capacity (the number of free blocks) of the duplicate independent volume (provision volume 501 P).

Although one embodiment has been described above, this is one example of the invention, and the scope of the invention is not limited to the embodiment. For example, in the above-described embodiment, the process of virtual volume duplication without movement of data has been described, however, the virtually replicated volume is sometimes used as a snapshot in general.

The snapshot saves the state of the volume at a certain point of time, but in the case of using the snapshot especially for backup use, it is not always necessary for the replication destination to be the provision volume. The provision volume may be allocated when the snapshot data is read from or written to the server system 201.

Therefore, at the time of acquiring the snapshot, the provision volume of the latest generation as the snapshot acquisition source (for example, the provision volume 501 P of the old generation in FIG. 33) is set as a duplicate single volume, the duplicate independent volume is taken as a snapshot, and a new provision volume (for example, the latest generation provision volume 501 Pa in FIG. 33) is created (step 3603 to step 3608 in FIG. 36).

In addition, when reading or writing the snapshot data from or to the server system 201, by performing an operation of attaching the snapshot to another provision volume (for example, the provision volume 501 S of the replication destination in FIG. 33) or the like, it is possible to read or write the snapshot data from or to the replication destination provision volume.

Also, when deleting a snapshot (duplicate single volume) that is not attached to a provisioning volume, it is possible that the duplicate single volume can have data that is referenced from a duplicate single volume of a newer generation or a provision volume.

As such a possibility, for example, in FIG. 33, even when there is no provision volume 501 S of the replication destination, it is possible that the duplicate single volume can have data that is referred to from the provision volume 501 Pa of the latest generation.

For the reason, the data being referred to is shifted to the reference source volume (in the example in FIG. 33, the latest generation provision volume 501 Pa), so the duplicate single volume is deleted.

Also, in the case of using as a snapshot, the replication source is used as a volume that carries out a production operation, and the replication destination is sometimes used as a backup. On the other hand, there are applications such as a restoring operation (restore) from the backup and a resynchronizing operation (resync) from a production volume to the backup.

Such applications can also be realized by the volume replication process with the replication destination explained by using FIG. 37. That is, by creating a replicate of the replication source volume and swapping the replication volume and the replication destination volume, movement of data is unnecessary, and quick restore/resync process can be realized.

The invention can be implemented in various other forms. For example, although the sending source (I/O source) of the I/O request such as the write request is the server system 201 in the above embodiment, it is also possible to store a program (not shown) (for example, an application program executed on a VM) in the storage system 200.

DESCRIPTION OF REFERENCE NUMERALS AND SIGNS

422 . . . Address translation table
51 . . . Page
501 . . . Logical volume
502 . . . Additional writing volume
601 . . . Block
602 . . . Sub-block

What is claimed is:

1. A storage controller, comprising:
a first interface which connects the storage controller to a server;
a second interface which connects the storage controller to a physical storage device;
a memory which stores a plurality of programs and a plurality of tables;
a processor which executes a first program among the plurality of programs stored in the memory and controls the second interface in response to a request received at the first interface,
wherein the memory:
stores a VOL management table, an address translation table, and a generation management table as a part of the plurality of tables;
registers a first provision volume and a first additional writing volume in the VOL management table;
registers a reference destination of a first address of the first provision volume as a second address of the first additional writing volume in the address translation table; and
registers that there is no child generation of the first provision volume in the generation management table, and
the processor executes a second program among the plurality of programs stored in the memory,
so as to receive a request for replication of the first provision volume at the first interface;
to register a second provision volume and a second additional writing volume in the VOL management table;
to register a third provision volume and a third additional writing volume in the VOL management table;
to register the second provision volume and the third provision volume in the generation management table as the child generation of the first provision volume;
to register the first provision volume in the generation management table as a parent generation of each of the second provision volume and the third provision volume; and
to process the request to the first provision volume received at the first interface as a request to the third provision volume.

2. The storage controller according to claim 1, wherein the processor executes a third program among the plurality of programs stored in the memory,
so as to set a write request to the first provision volume received at the first interface as a write request to the third provision volume, and control to write to the third additional writing volume, and
to control to write to the second additional writing volume in response to the write request to the second provision volume received at the first interface.

3. The storage controller according to claim 1, wherein the processor executes a fourth program among the plurality of programs stored in the memory,
so as to set a read request to the first provision volume received at the first interface as a read request to the third provision volume, specify the first provision volume of the parent generation of the third provision volume registered in the generation management table, and set it as the read request to the first provision volume of the parent generation, and
to specify the first provision volume of the parent generation of the second provision volume registered in the generation management table, and set it as the read request to the first provision volume of the parent generation in response to the read request to the second provision volume received at the first interface.

4. The storage controller according to claim 3,
wherein the processor executes the fourth program, so as
to control to read from the second address of the first
additional writing volume registered in the address
translation table as the reference destination of the first
address of the first provision volume of the parent
generation.

5. The storage controller according to claim 1,
wherein the processor executes the second program
among the plurality of programs stored in the memory,
so as to receive a request for replication of the second
provision volume at the first interface;
to register a fourth provision volume and a fourth
additional writing volume in the VOL management
table;
to register a fifth provision volume and a fifth additional writing volume in the VOL management table;
to register the fourth provision volume and the fifth
provision volume in the generation management
table as the child generation of the second provision
volume;
to register the second provision volume in the generation management table as the parent generation of
each of the fourth provision volume and the fifth
provision volume; and
to process the request to the second provision volume
received at the first interface as a request to the fifth
provision volume.

6. The storage controller according to claim 2,
wherein the processor executes a fifth program among the
plurality of programs stored in the memory,
so as to set a deletion request to the first provision volume
received at the first interface as a deletion request to the
third provision volume, control to delete the third
additional writing volume, delete the third provision
volume registered in the generation management table
as the child generation of the first provision volume,
and
to control to delete the second additional writing volume,
delete the second provision volume registered in the
generation management table as the child generation of
the first provision volume in response to the deletion
request to the second provision volume received at the
first interface.

7. The storage controller according to claim 4,
wherein a reference destination of the first address of the
first provision volume is registered as the second
address of the first additional writing volume in the
address translation table,
the processor executes a sixth program among the plurality of programs stored in the memory, so as to
replicate the data of the second address to a third
address for a garbage collection, and change the second
address registered in the address translation table to the
third address, and
the processor executes the fourth program after an execution of the sixth program, so as to control to read from
the third address of the first additional writing volume
registered in the address translation table as the reference destination of the first address of the first provision volume of the parent generation in response to the
read request to the first address of the first provision
volume or the second provision volume received at the
first interface.

8. The storage controller according to claim 2,
wherein the processor executes the third program, so as to
control to write to the third additional writing volume
and the second additional writing volume, and
the processor executes a seventh program among the
plurality of programs stored in the memory after
executing the third program,
so as to refer to the information of the child generation
of the first provision volume registered in the generation management table, and delete the second
address of the first additional writing volume of the
reference destination of the first address of the first
provision volume registered in the address translation table, and
delete the first provision volume and the first additional
writing volume when the second address of the first
additional writing volume disappears in the address
translation table.

9. A storage controller, comprising:
a first interface which connects the storage controller to a
server;
a second interface which connects the storage controller
to a physical storage device;
a memory which stores a plurality of programs and a
plurality of tables;
a processor which executes a first program among the
plurality of programs stored in the memory and controls the second interface in response to a request
received at the first interface,
wherein the memory:
stores a VOL management table, an address translation
table, and a generation management table as a part of
the plurality of tables;
registers a first provision volume and a first additional
writing volume in the VOL management table;
registers the reference destination of the first address of
the first provision volume as the second address of
the first additional writing volume in the address
translation table; and
registers that there is no child generation of the first
provision volume in the generation management
table;
the processor executes the eighth program among the
plurality of programs stored in the memory,
so as to receive the request for replication of the first
provision volume at the first interface;
to register a third provision volume and a third additional writing volume in the VOL management table;
to register the third provision volume in the generation
management table as the child generation of the first
provision volume;
to register the first provision volume in the generation
management table as each parent generation of the
third provision volume;
to process the request to the first provision volume
received at the first interface as the request to the
third provision volume.

10. The storage controller according to claim 9,
wherein the processor executes a ninth program among
the plurality of programs stored in the memory,
so as to receive a request to the second provision
volume at the first interface;
to attach the first provision volume to the second
provision volume, and
to process the request to the second provision volume
received at the first interface as a request to the first
provision volume.

11. The storage controller according to claim 9,
wherein the processor executes a tenth program among the plurality of programs stored in the memory,
so as to copy the data written to the first additional writing volume to the third additional writing volume,
to register the second address of the third additional writing volume in the address translation table as the reference destination of the first address of the third provision volume; and
to delete the first provision volume and the first additional writing volume when the second address of the first additional writing volume disappears in the address translation table.

12. A storage control method according to a computer,
wherein the computer including:
a first interface which connects the computer to a server;
a second interface which connects the computer to a physical storage device;
a memory which stores the plurality of programs and the plurality of tables;
a processor which executes a first program among the plurality of programs stored in the memory and controls the second interface in response to a request received at the first interface,
wherein the memory:
stores a VOL management table, an address translation table, and a generation management table as a part of the plurality of tables;
registers a first provision volume and a first additional writing volume in the VOL management table;
registers a reference destination of a first address of the first provision volume as a second address of the first additional writing volume in the address translation table; and
registers that there is no child generation of the first provision volume in the generation management table,
the processor executes the second program among the plurality of programs stored in the memory,
so as to receive the request for replication of the first provision volume at the first interface;
to register a second provision volume and a second additional writing volume in the VOL management table;
to register a third provision volume and a third additional writing volume in the VOL management table;
to register the second provision volume and the third provision volume in the generation management table as the child generation of the first provision volume;
to register the first provision volume in the generation management table as a parent generation of each of the second provision volume and the third provision volume; and
to process the request to the first provision volume received at the first interface as the request to the third provision volume.

* * * * *